(12) United States Patent
Shinohara

(10) Patent No.: US 8,228,615 B2
(45) Date of Patent: Jul. 24, 2012

(54) ZOOM LENS AND CAMERA HAVING THE SAME

(75) Inventor: Kenji Shinohara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 556 days.

(21) Appl. No.: 12/486,482

(22) Filed: Jun. 17, 2009

(65) Prior Publication Data

US 2009/0316266 A1    Dec. 24, 2009

(30) Foreign Application Priority Data

Jun. 18, 2008 (JP) ................................. 2008-159666
Jan. 23, 2009 (JP) ................................. 2009-013317

(51) Int. Cl.
*G02B 15/14* (2006.01)
*G02B 27/64* (2006.01)

(52) U.S. Cl. .................. 359/687; 359/676; 359/557

(58) Field of Classification Search .............. 359/687, 359/686, 683, 685
See application file for complete search history.

(56) References Cited

U.S. PATENT DOCUMENTS

| | | | | |
|---|---|---|---|---|
| 5,585,966 A | | 12/1996 | Suzuki | |
| 5,963,378 A | * | 10/1999 | Tochigi et al. | 359/687 |
| 7,227,699 B2 | * | 6/2007 | Hamano et al. | 359/687 |
| 7,623,300 B2 | * | 11/2009 | Hoshi | 359/687 |
| 7,948,686 B2 | * | 5/2011 | Hoshi | 359/687 |
| 2007/0279764 A1 | | 12/2007 | Hoshi | |

* cited by examiner

*Primary Examiner* — Ricky Mack
*Assistant Examiner* — Zachary Wilkes
(74) *Attorney, Agent, or Firm* — Canon USA Inc IP Division

(57) ABSTRACT

A zoom lens including four lens units having positive, negative, positive, and positive refractive power in order from an object side to an image side thereof, wherein the distance between the adjacent lens units changes when zooming: wherein the third lens unit includes, in order from the object side to the image side, a first lens subunit having negative refractive power and a second lens subunit having positive refractive power. The zoom lens is configured to displace an image formed by the zoom lens in a direction perpendicular to its optical axis by moving the second lens subunit so as to have a component perpendicular to the optical axis, wherein the curvature radius of a surface, closest to the object, of the first lens subunit and the curvature radius of a surface second closest to the object, of the first lens subunit are set at appropriate values.

3 Claims, 21 Drawing Sheets

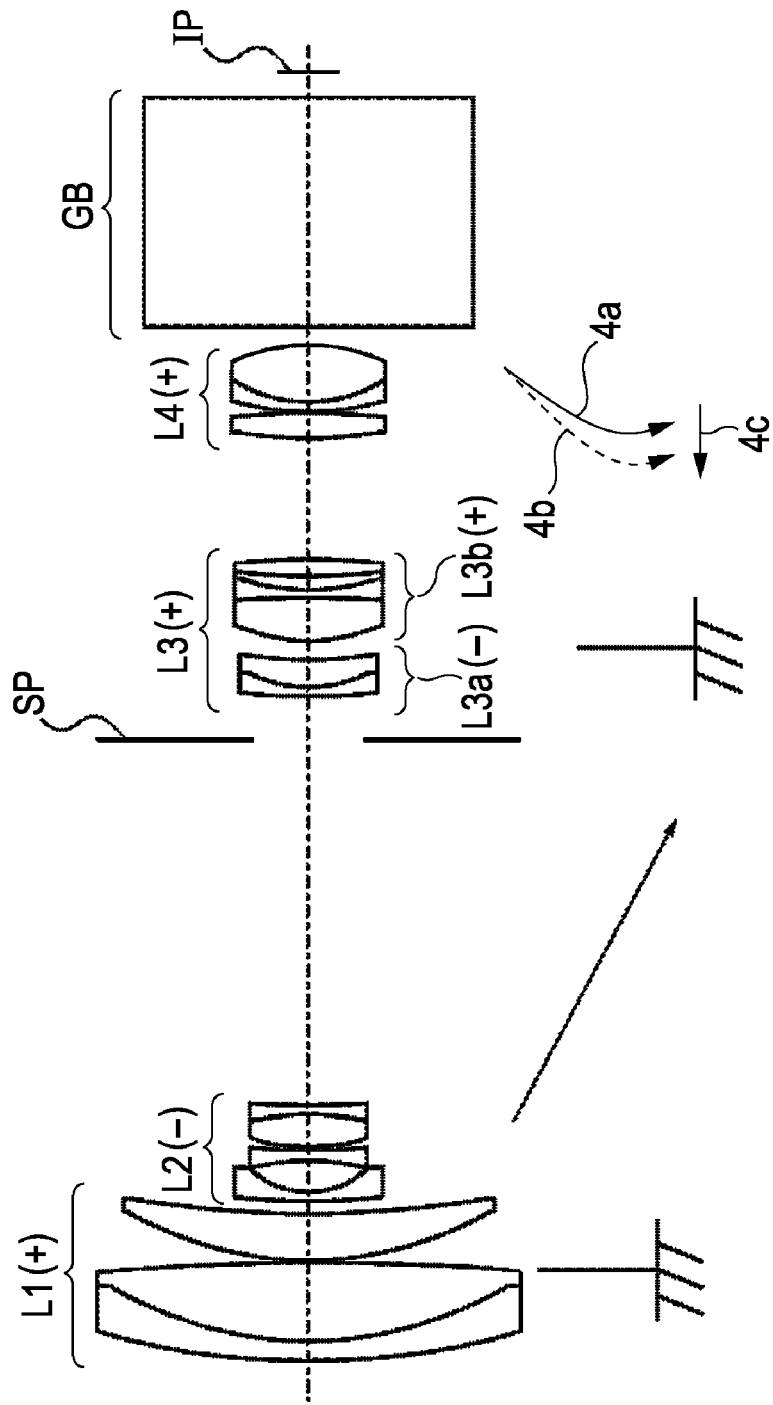

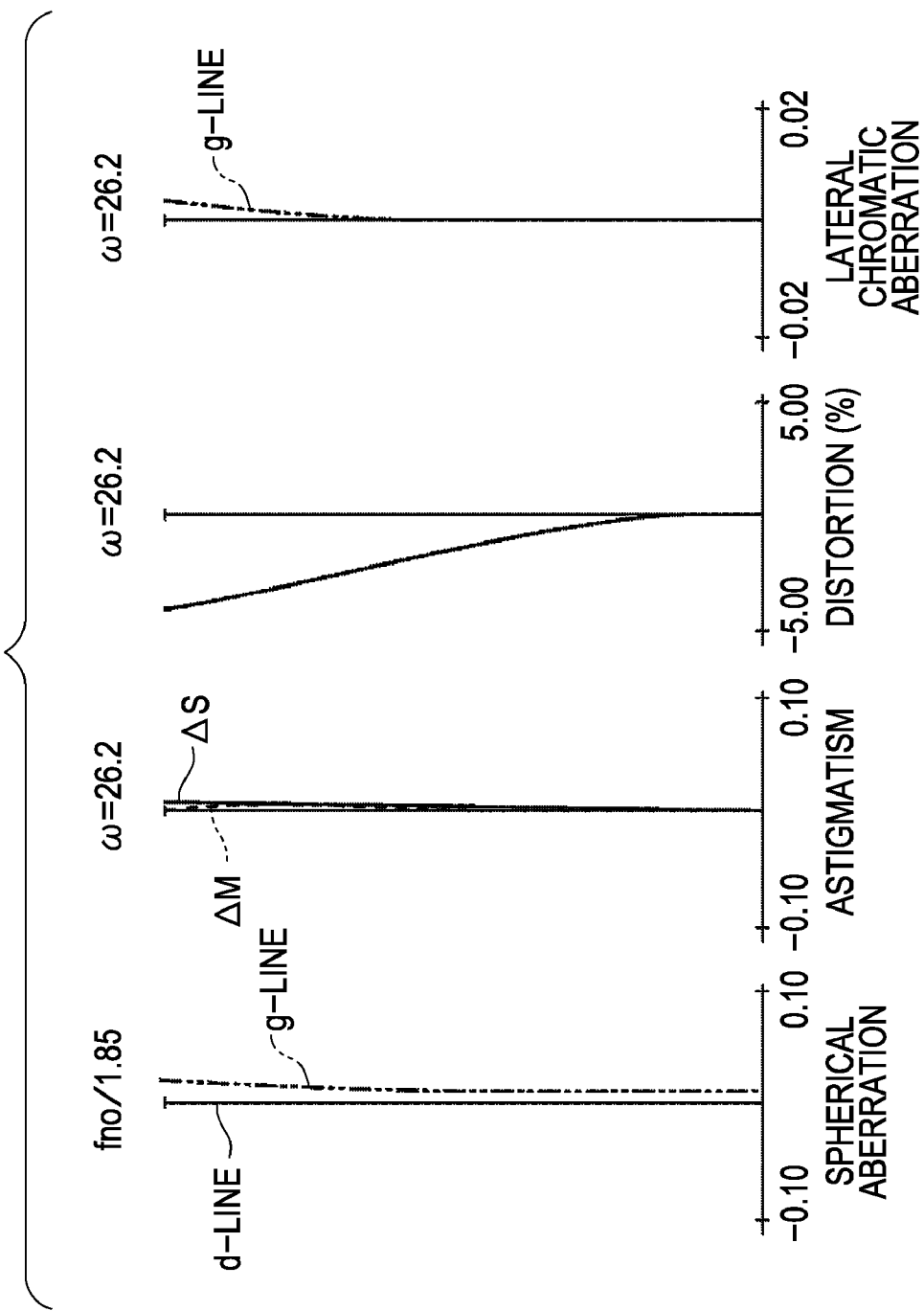

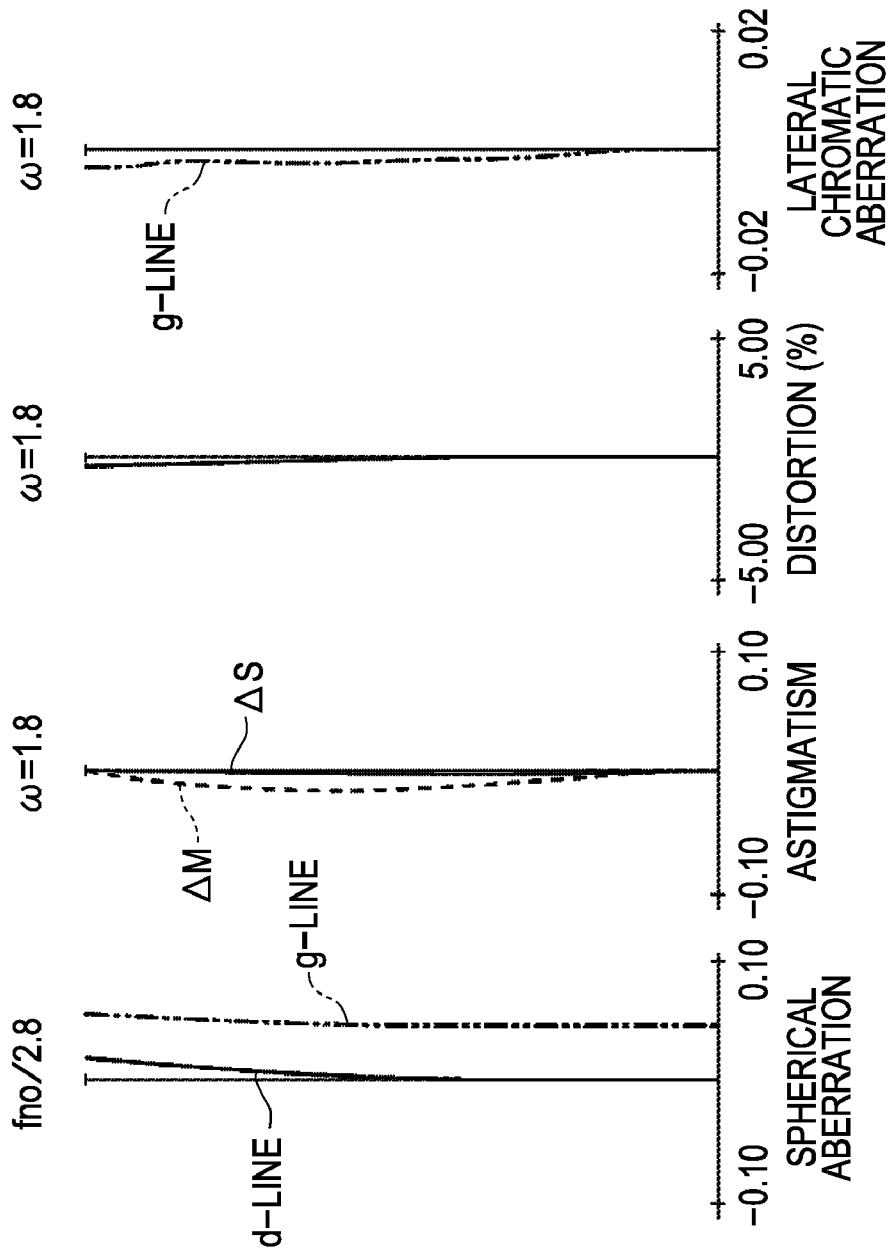

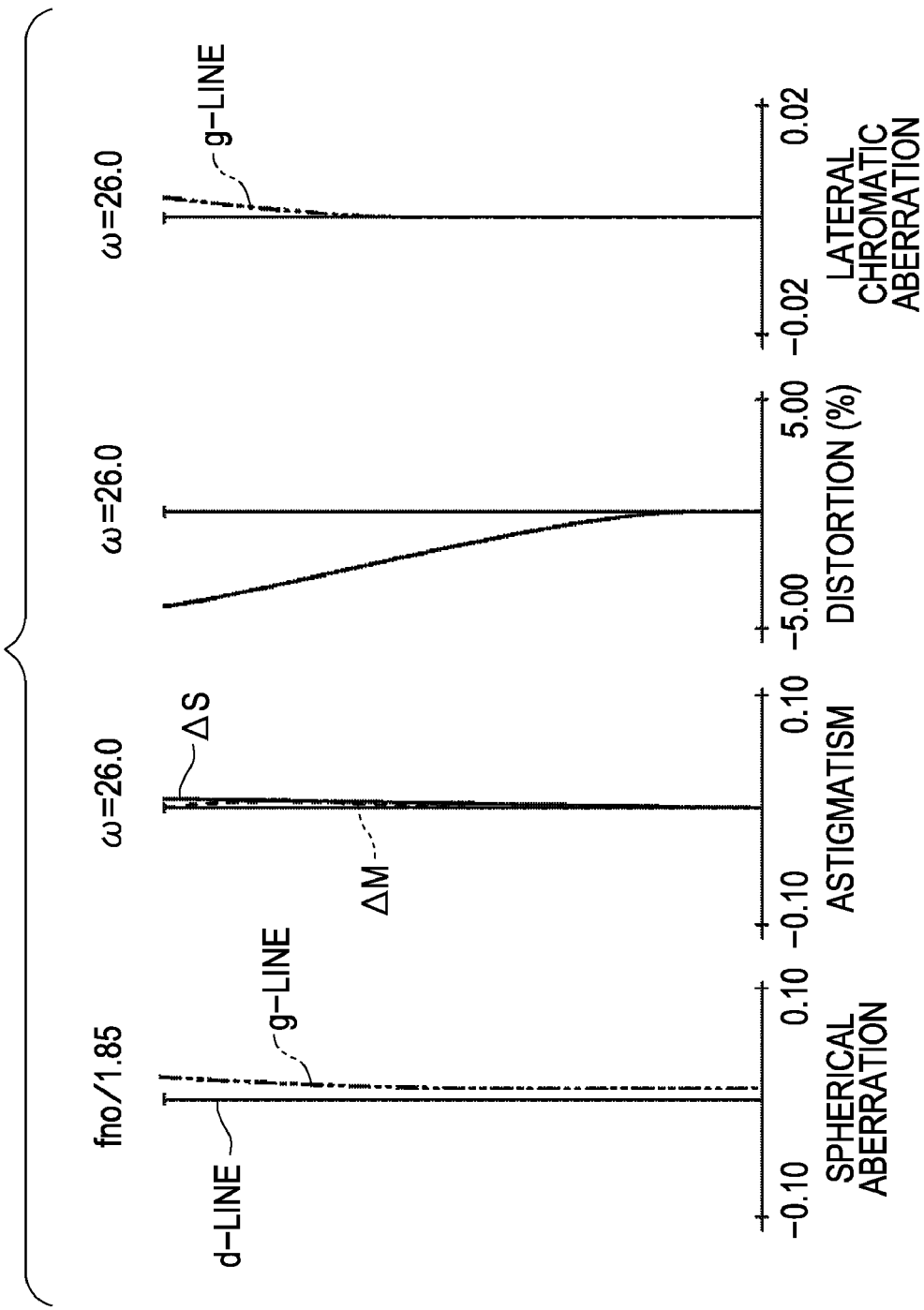

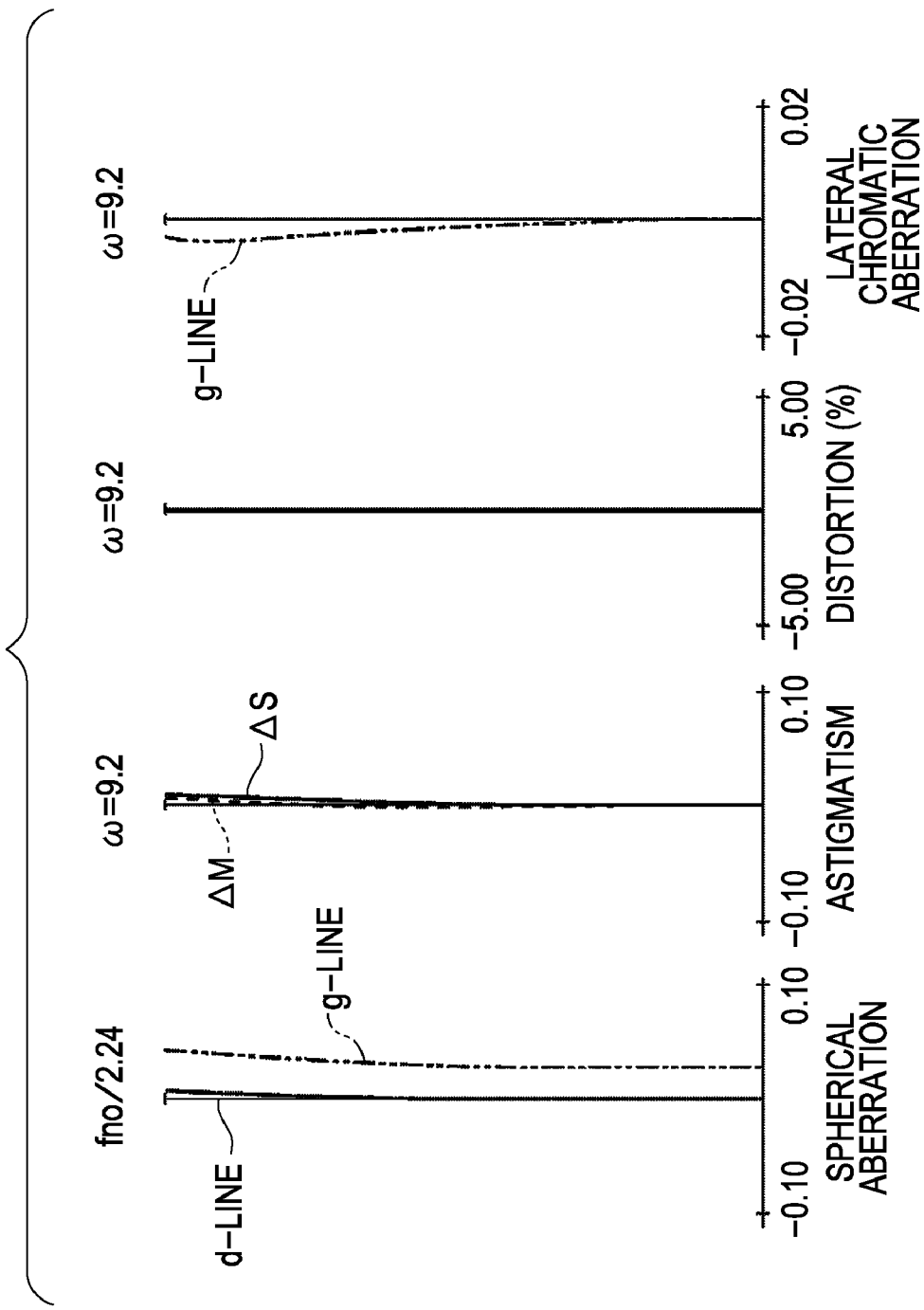

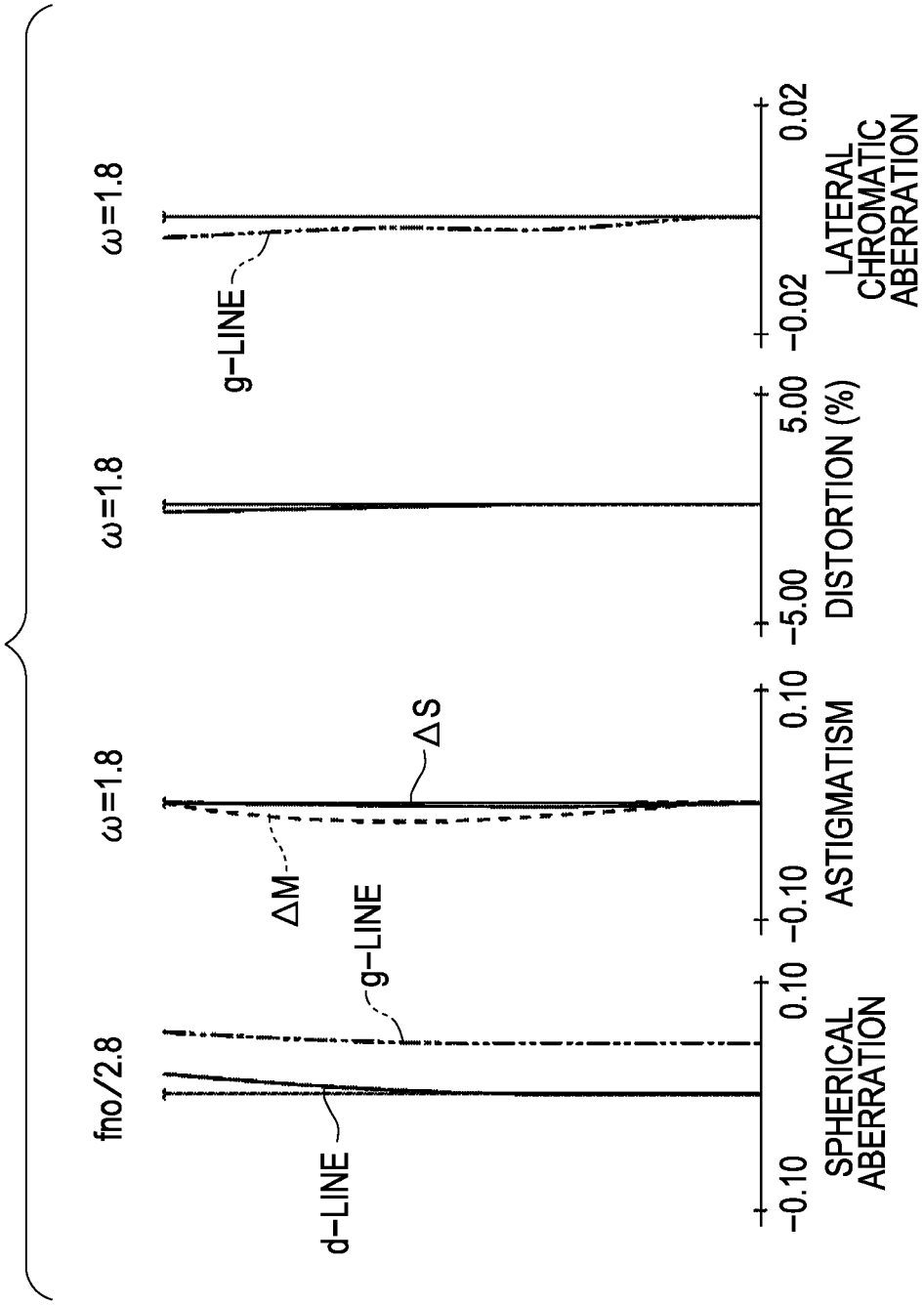

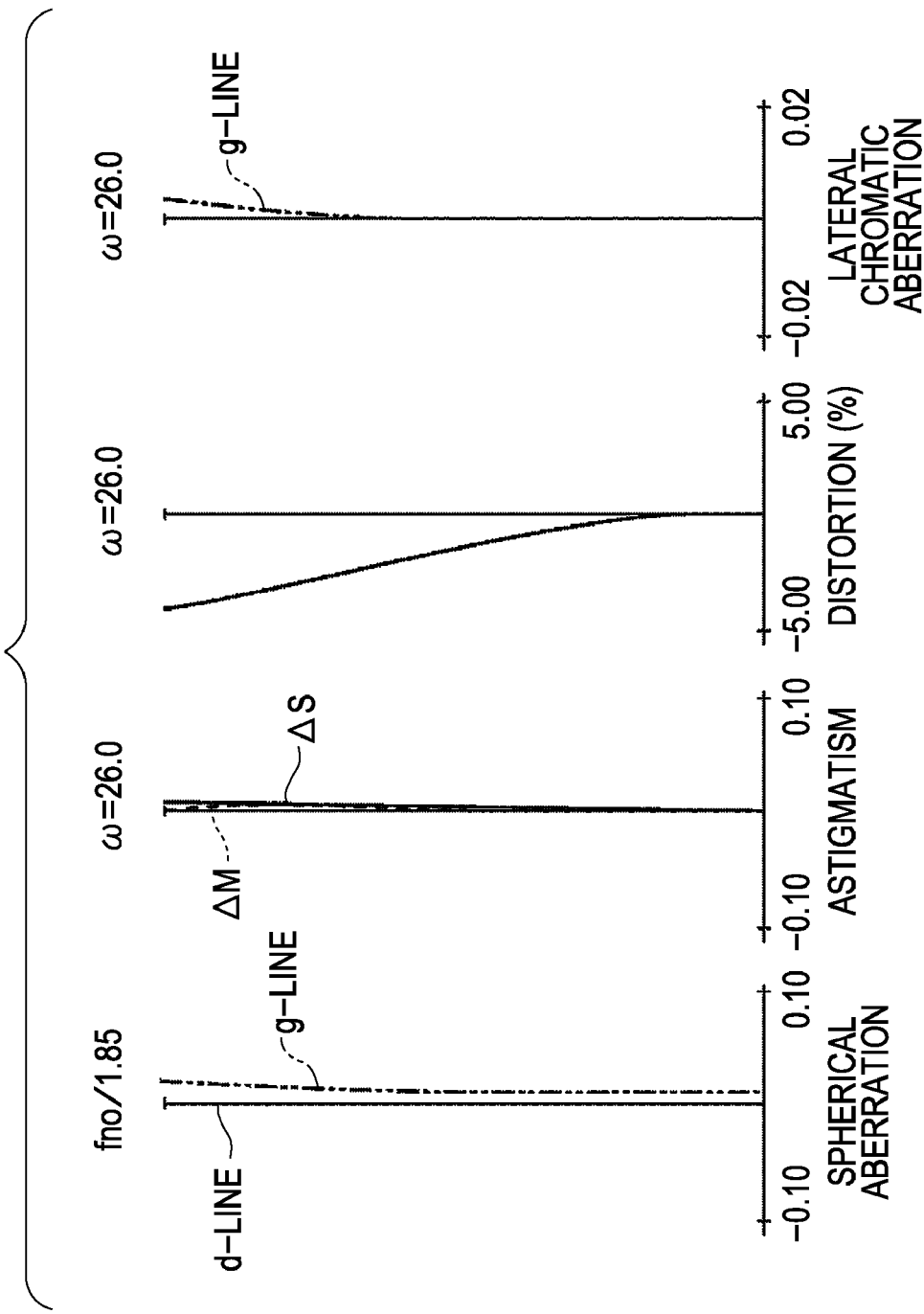

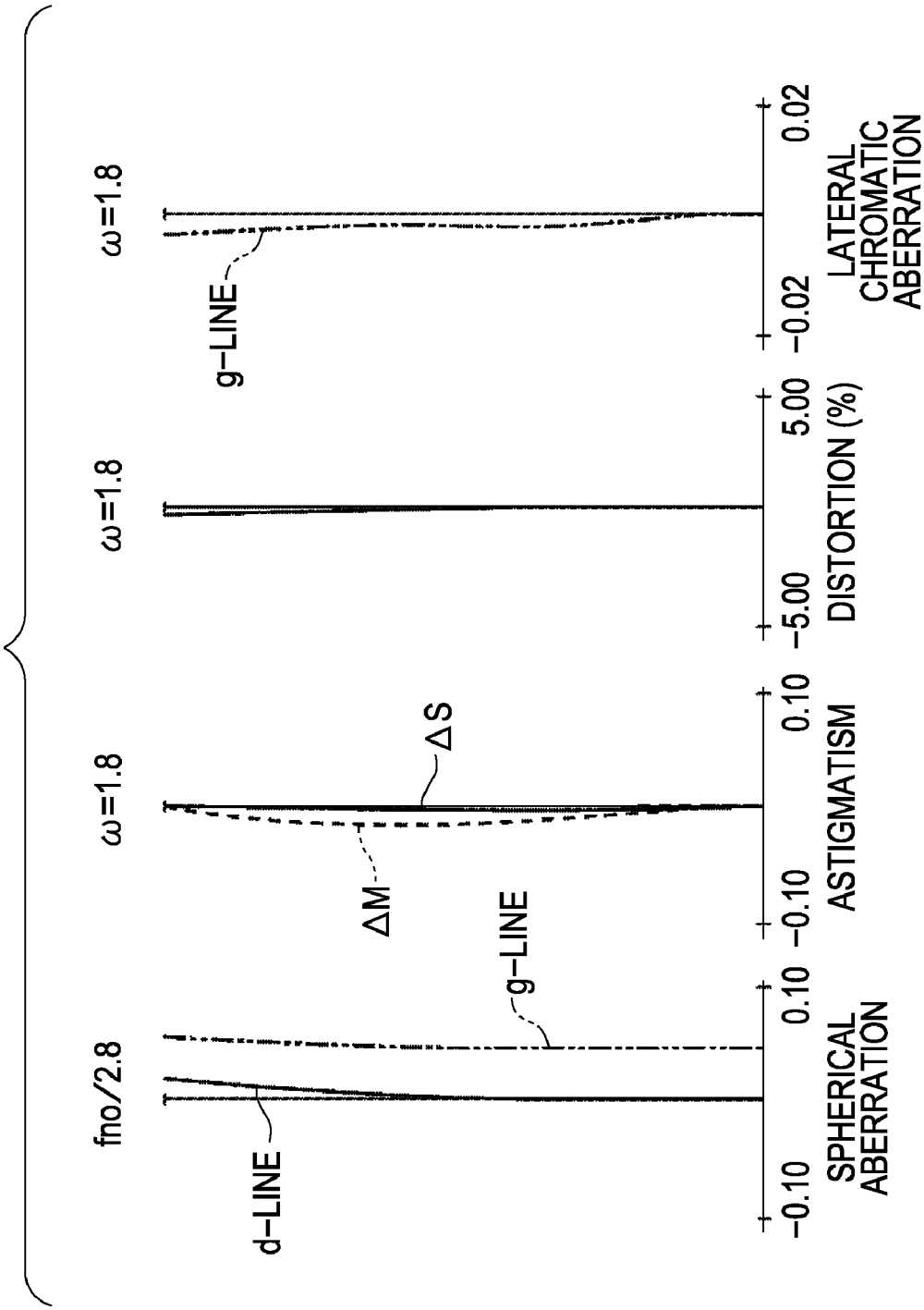

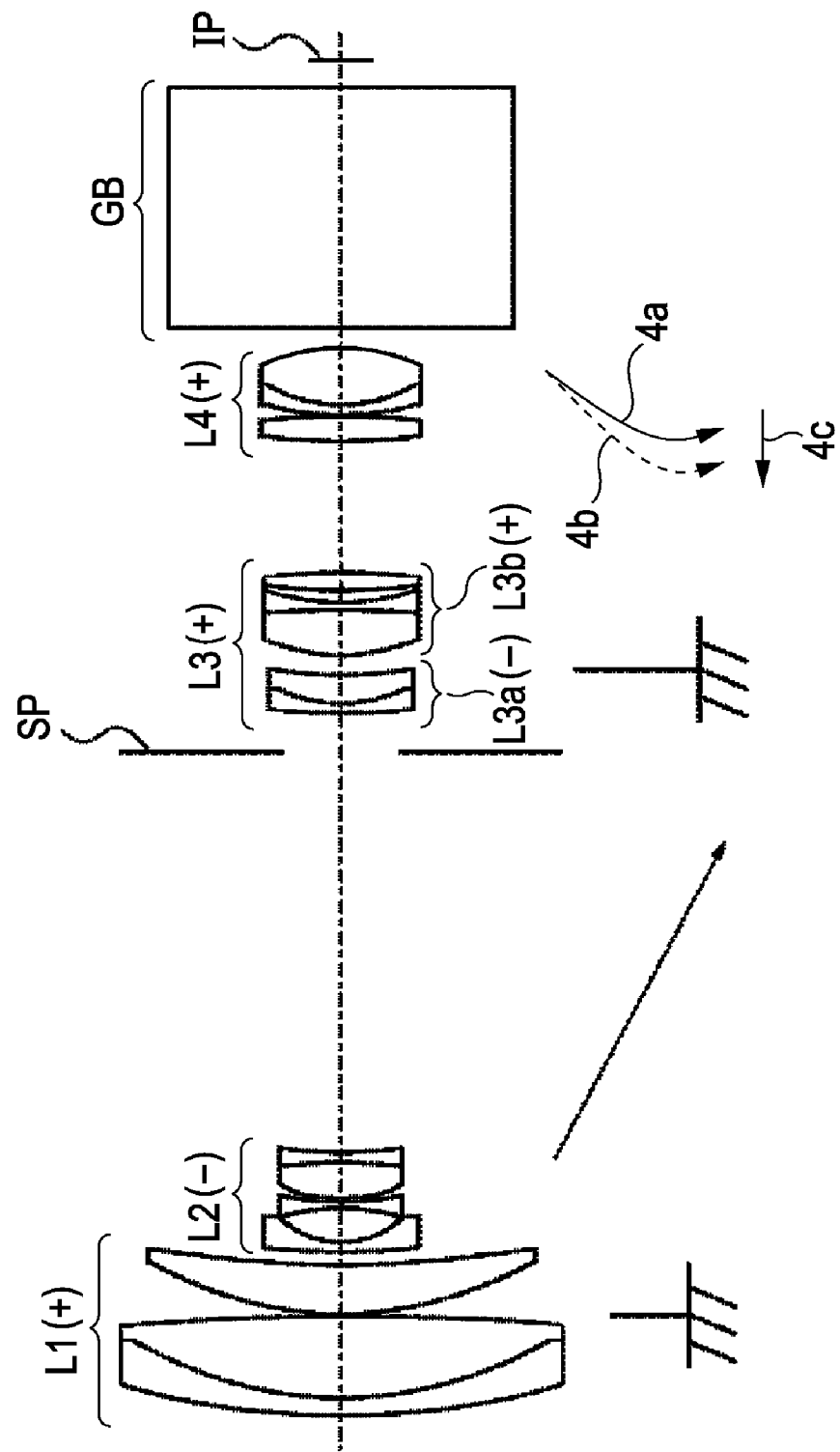

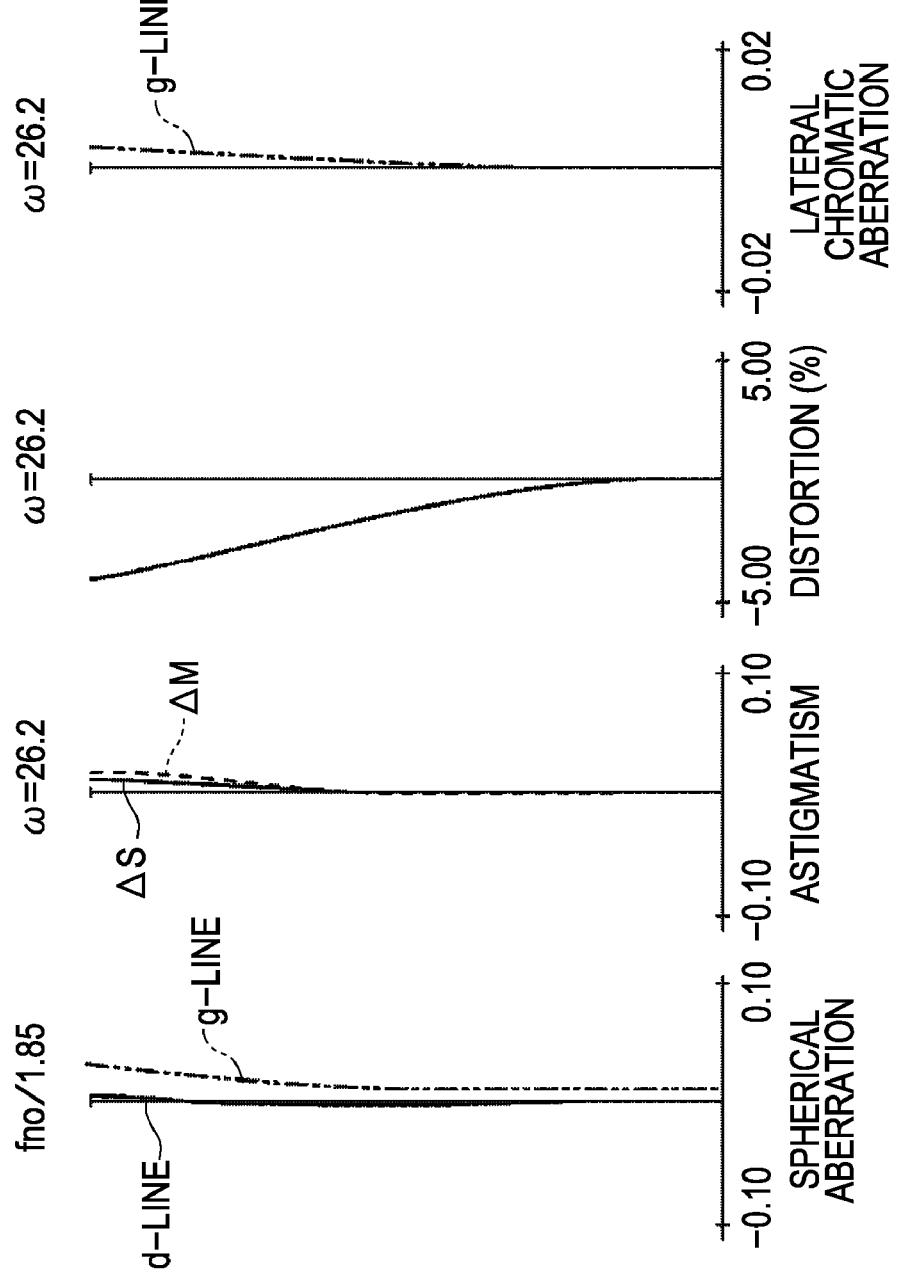

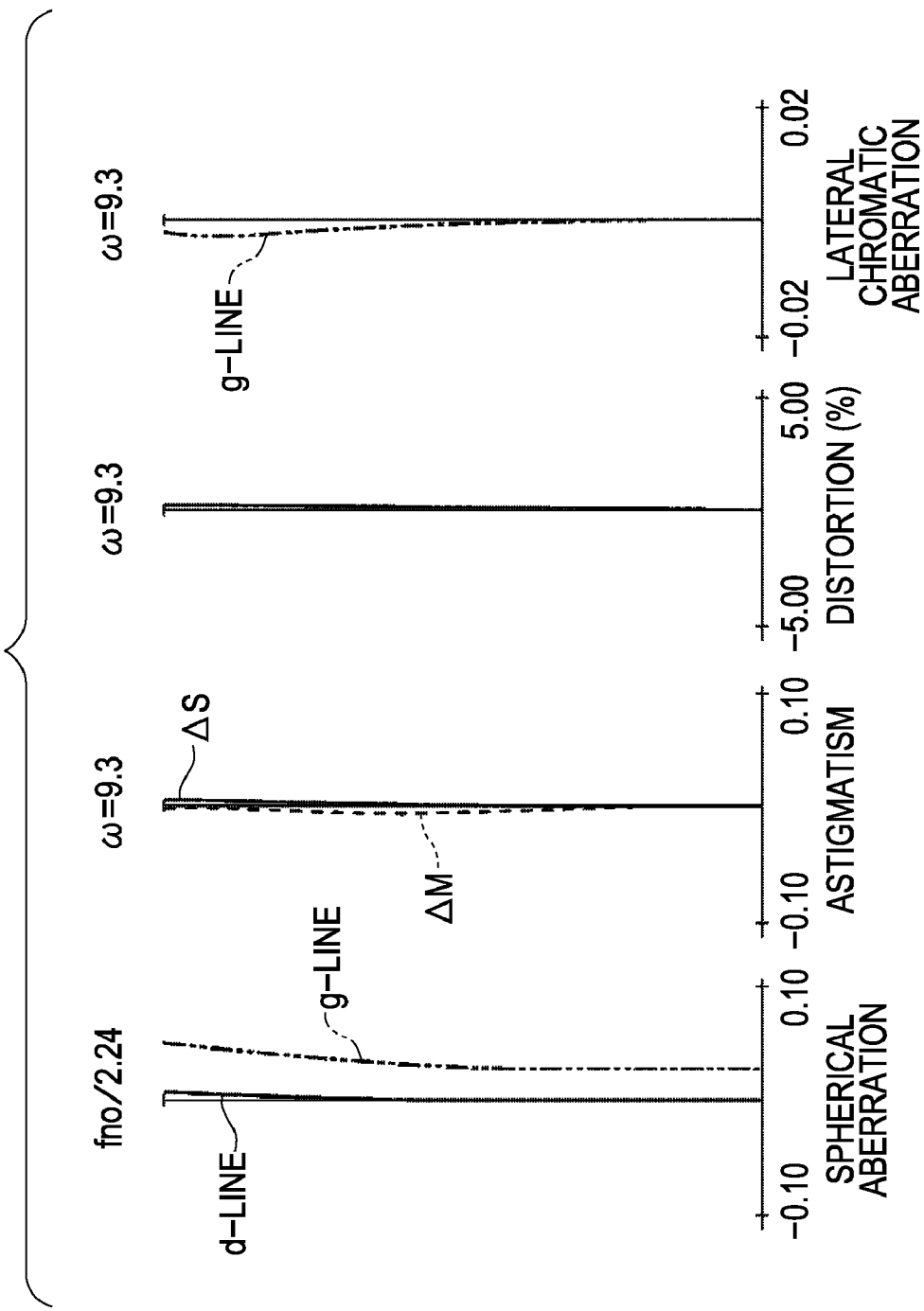

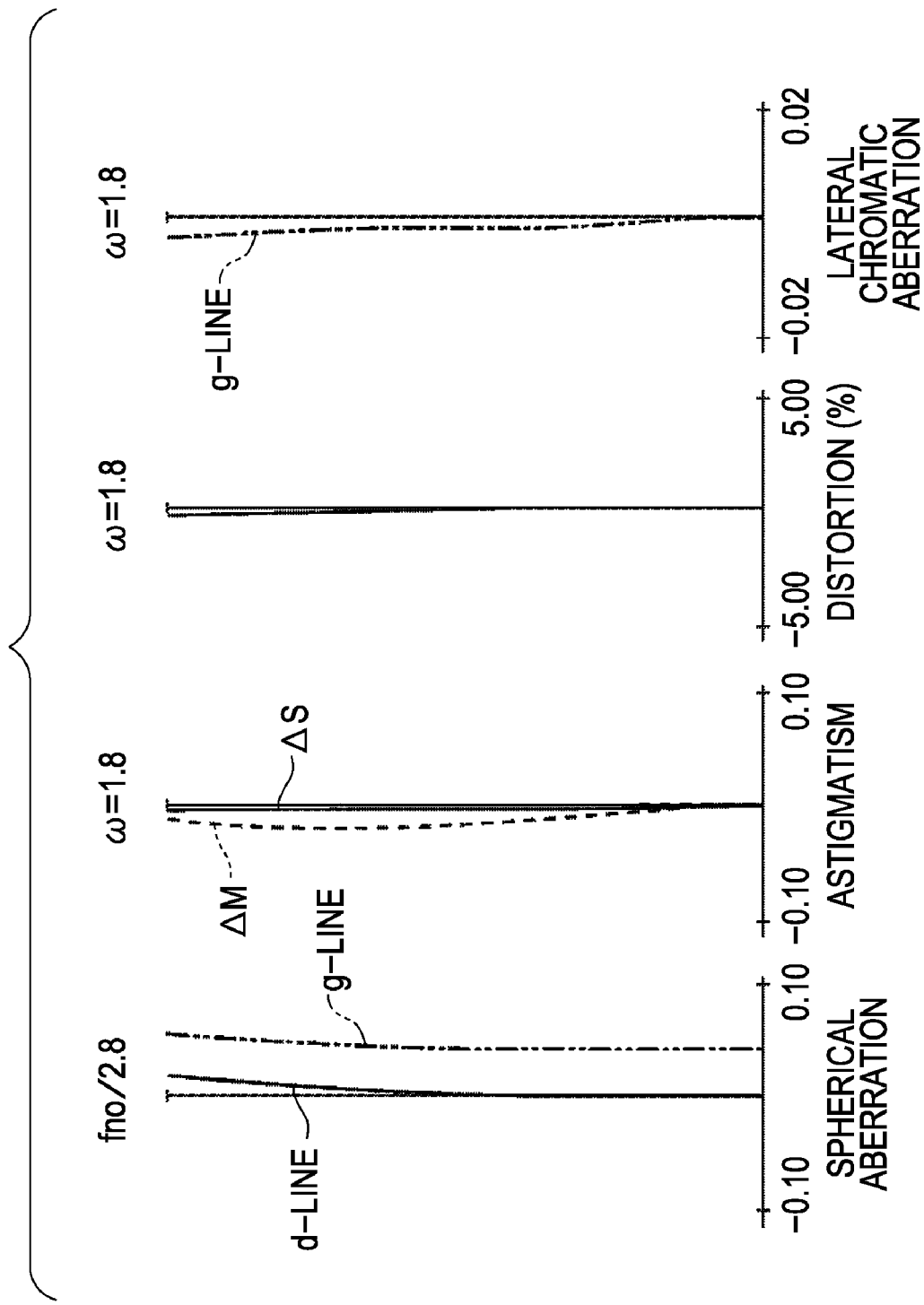

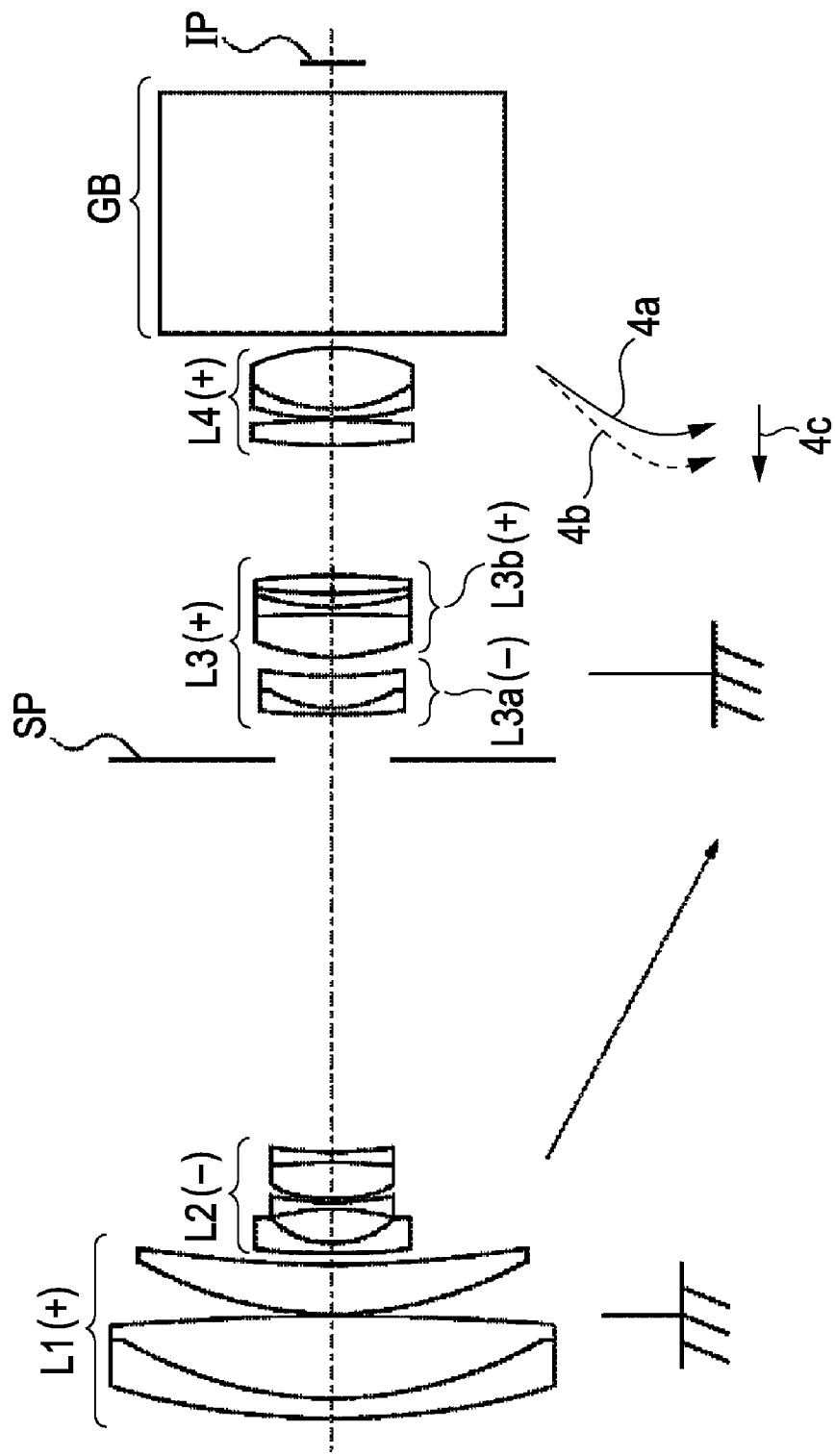

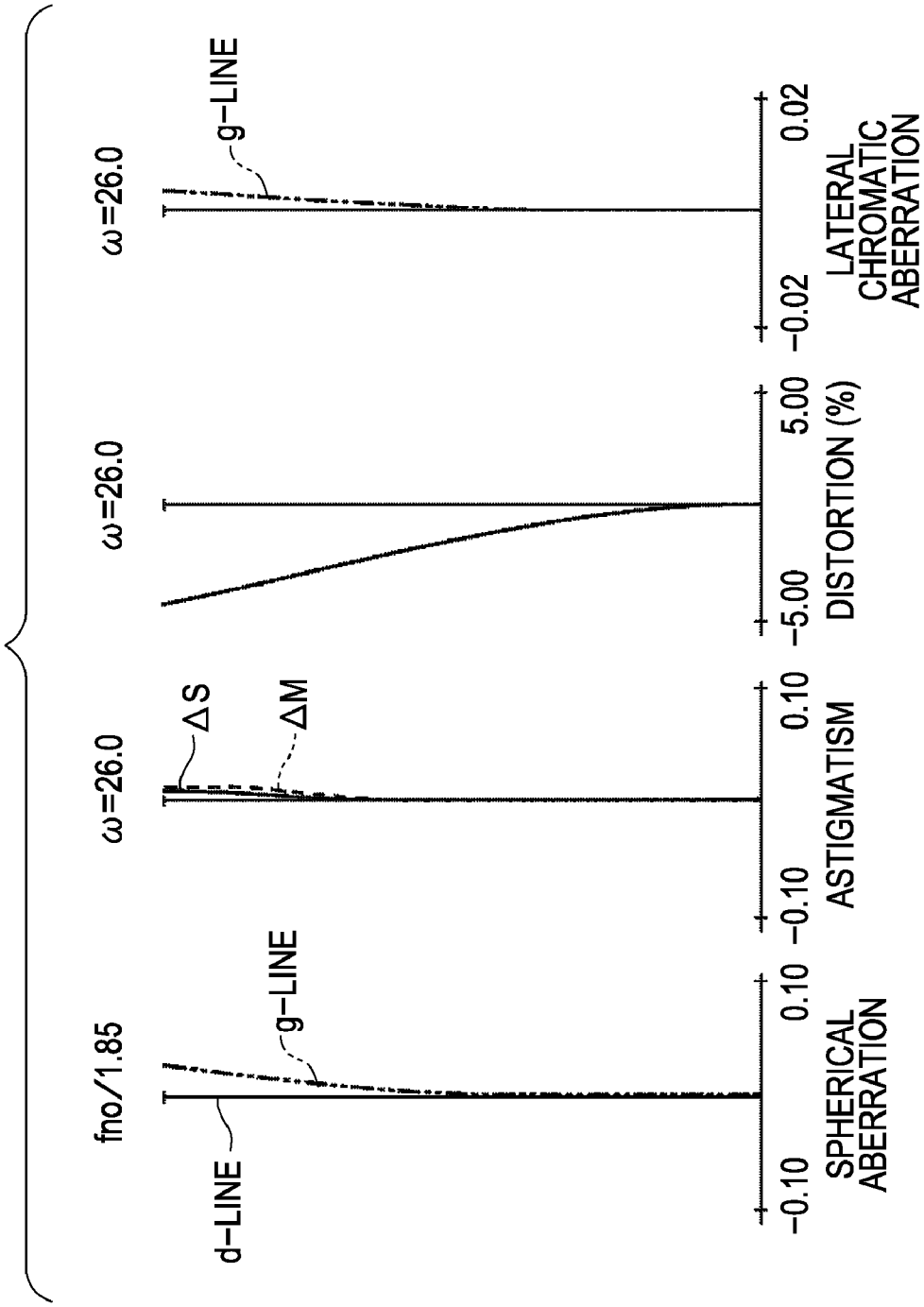

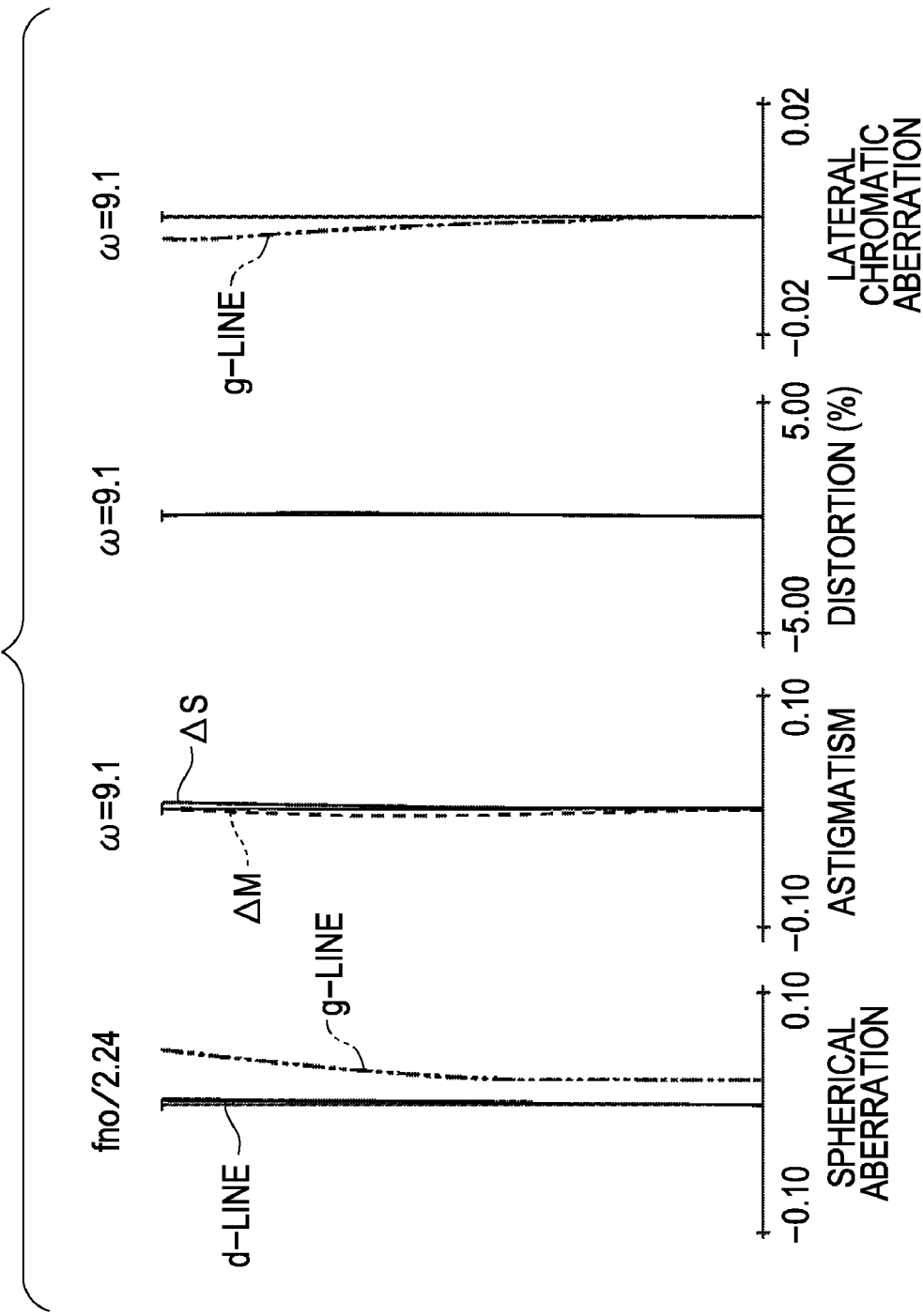

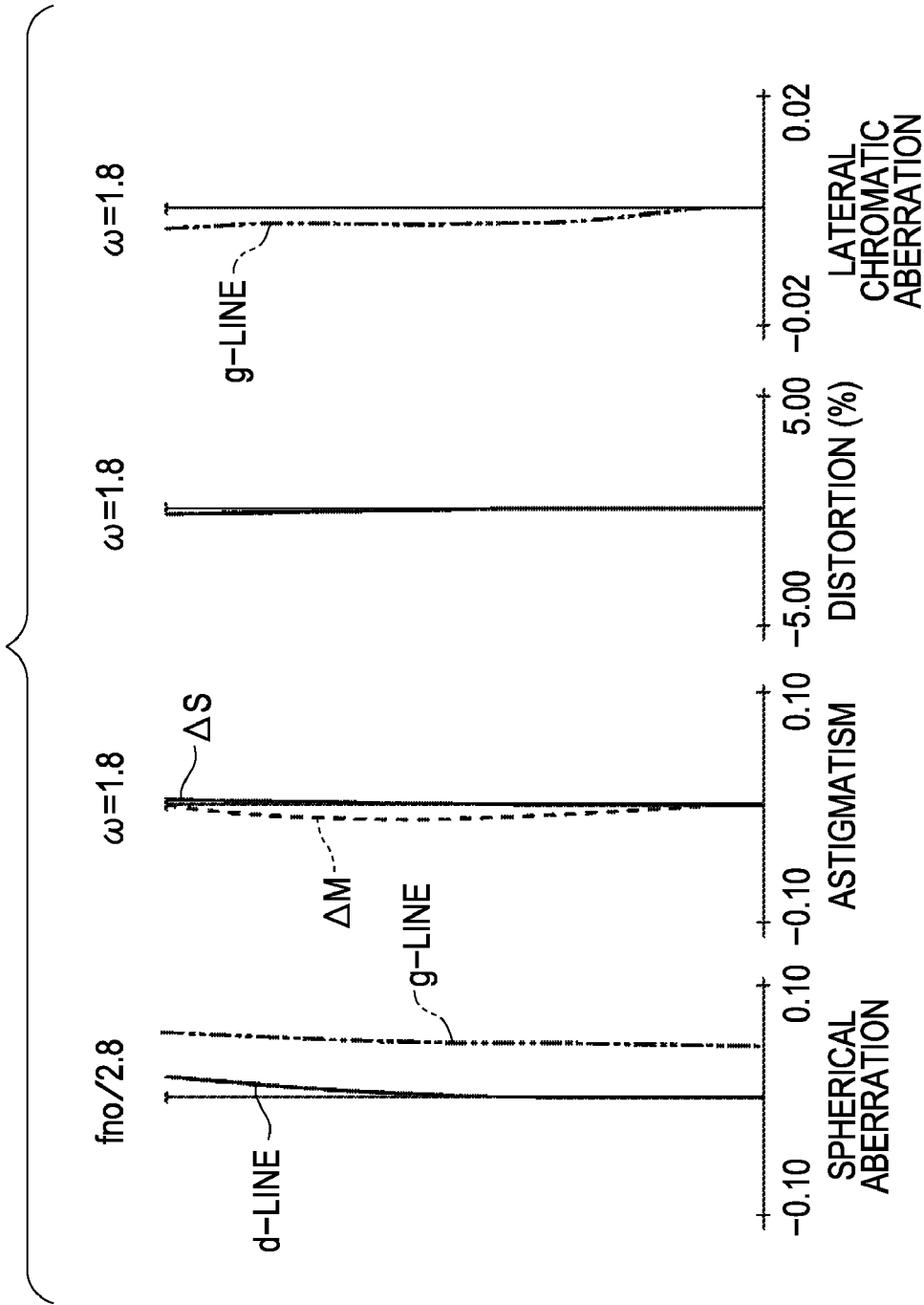

ZOOM LENS AND CAMERA HAVING THE SAME

BACKGROUND OF THE INVENTION

1. Field of the Invention

The present invention relates to zoom lenses. Zoom lenses according to embodiments of the present invention are suitable for a photographing optical system of cameras, such as video cameras or digital cameras, that use a photoelectric conversion element.

2. Description of the Related Art

When capturing an image with an image capturing apparatus such as a video camera or a digital camera, a photographed image is sometimes degraded in quality (hereinafter simply referred to as "image blur") due to hand shake or the like. Accordingly, there is proposed an optical system that has the function of preventing such image blur by moving part of lens units constituting a photographing optical system.

U.S. Pat. No. 5,585,966 prevents image blur due to hand shake or the like by moving the whole of a third lens unit of a zoom lens comprises four positive, negative, positive, and positive lens units in a direction perpendicular to its optical axis.

A photographing optical system requires significantly high optical performance along with recent miniaturization of solid-state image pickup elements and significant decrease in pixel pitch. Furthermore, video cameras and digital cameras need to have a color separation prism, an optical low-pass filter and so on between a zoom lens and a solid-state image pickup element. Therefore, such cameras also need to have necessary back focus.

For example, suppose a 3-CCD camera that needs a color separation prism behind a zoom lens. In this case, it is difficult to achieve both of ensuring back focus and high optical performance with the zoom lens disclosed in U.S. Pat. No. 5,585,966.

SUMMARY OF THE INVENTION

The present invention provides a zoom lens having a compensation lens unit for correcting image blur to provide high optical performance while ensuring desired back focus.

According to an aspect of the present invention, there is provided a zoom lens comprising, in order from an object side to an image side thereof, a first lens unit having positive refractive power, a second lens unit having negative refractive power, a third lens unit having positive refractive power, and a fourth lens unit having positive refractive power, wherein the distance between the adjacent lens units changes when zooming. The third lens unit includes, in order from the object side to the image side, a first lens subunit having negative refractive power and a second lens subunit having positive refractive power. The zoom lens is configured to displace an image formed by the zoom lens in a direction perpendicular to its optical axis by moving the second lens subunit so as to have a component perpendicular to the optical axis. The zoom lens is configured such that a curvature radius of a surface, closest to the object, of the first lens subunit and a curvature radius of a surface second closest to the object are set at appropriate values.

Further features of the present invention will become apparent from the following description of exemplary embodiments with reference to the attached drawings.

BRIEF DESCRIPTION OF THE DRAWINGS

FIG. 1 is a sectional view of a zoom lens according to a first embodiment of the present invention.

FIGS. 2A to 2C are aberration diagrams of the zoom lens of the first embodiment.

FIGS. 4A to 4C are aberration diagrams of the zoom lens of the second embodiment.

FIGS. 6A to 6C are aberration diagrams of the zoom lens of the third embodiment.

FIG. 7 is a sectional view of a zoom lens according to a fourth embodiment of the present invention.

FIGS. 8A to 8C are aberration diagrams of the zoom lens of the fourth embodiment.

FIG. 9 is a sectional view of a zoom lens according to a fifth embodiment of the present invention.

FIGS. 10A to 10C are aberration diagrams of the zoom lens of the fifth embodiment.

DESCRIPTION OF THE EMBODIMENTS

Figure 2B:
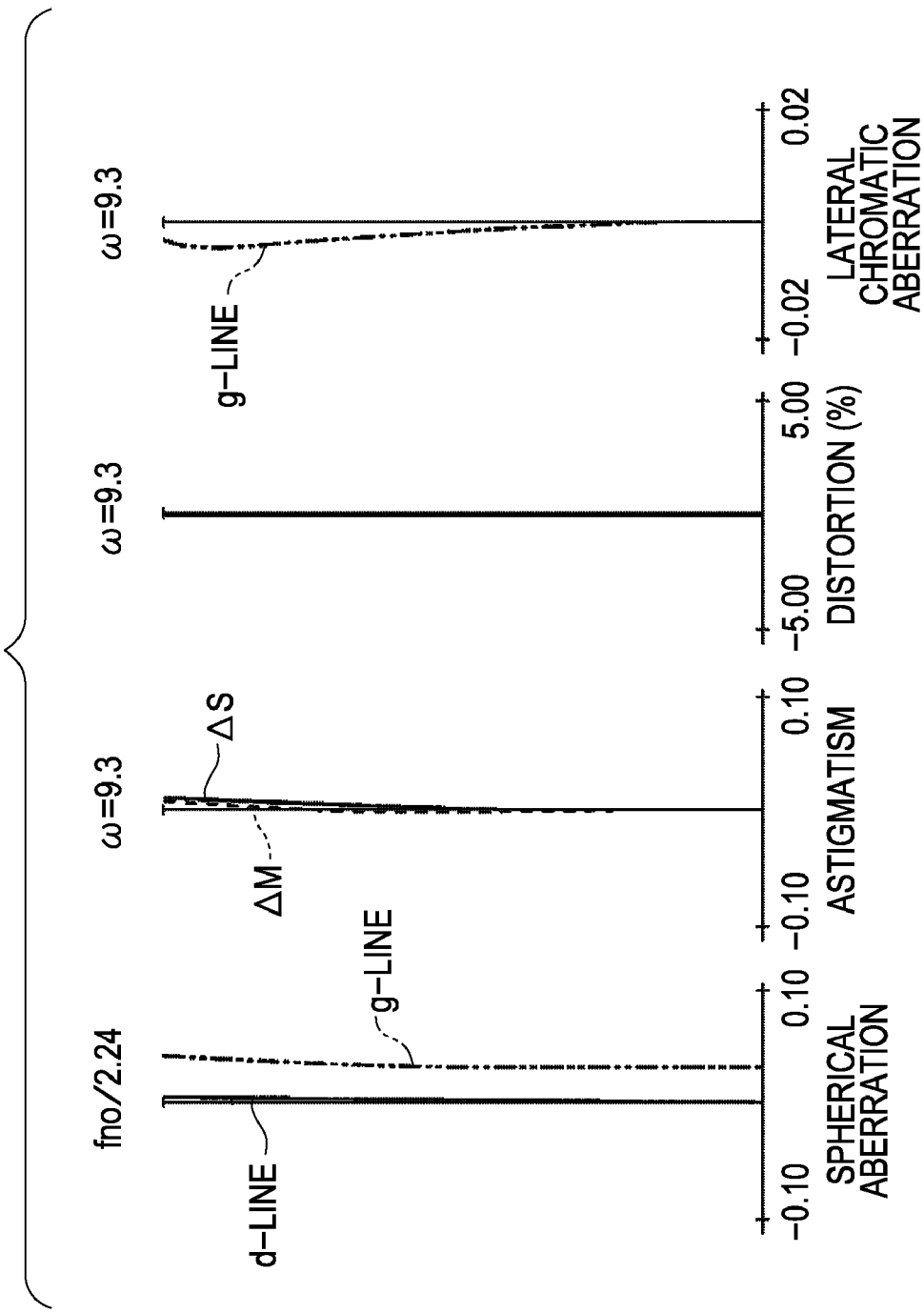

Zoom lenses according to embodiments of the present invention will be described hereinbelow with reference to the drawings. First, the outline of the zoom lenses according to embodiments of the present invention will be described.

The zoom lenses according to embodiments of the present invention each comprises, from an object side to an image side, a first lens unit having positive refractive power (optical power=the reciprocal of a focal length), a second lens unit having negative refractive power, a third lens unit having positive refractive power, and a fourth lens unit having positive refractive power. "The distance between the adjacent lens units" in the present invention changes during zooming. "The distance between the adjacent lens units" includes "the distance between the first lens unit and the second lens unit", "the distance between the second lens unit and the third lens unit", and "the distance between the third lens unit and the fourth lens unit".

In this four-unit zoom lens, the third lens unit comprises a lens unit L3a having negative refractive power and a lens unit L3b having positive refractive power. By moving the lens unit L3b so as to have a component perpendicular to the optical axis, an image formed by the zoom lens is displaced in a direction perpendicular to the optical axis. That is, the lens unit L3b serves as a compensation lens unit for correcting image blur.

Furthermore, the zoom lens is configured to satisfy the following condition:

$$0.30 < (R3a1 - R3a2)/(R3a1 + R3a2) < 0.85 \quad (1)$$

where R3a1 is the curvature radius of a surface of the lens unit L3a closest to the object, and R3a2 is the curvature radius of a surface of the lens unit L3a second closest to the object.

The conditional expression (1) defines the shape of a lens, of the lens unit L3a, arranged closest to the object. By satisfying the conditional expression (1), it is possible to provide desired back focus while ensuring high optical performance.

If the ratio, $(R3a1-R3a2)/(R3a1+R3a2)$, exceeds the upper limit in the conditional expression (1), axial light entering the lens unit L3b becomes high, so that degradation in optical performance, in particular, degradation in axial coma aberration during correction of image blur is increased.

In contrast, if the ratio falls below the lower limit in the conditional expression (1), the principal-point position of the lens unit L3a is located near the image, which is not preferable in providing desired back focus. Furthermore, the degree of the meniscus of a lens of the lens unit L3a arranged closest to the object is increased, so that light is spattered by this lens. This increases the angle of light incident on a surface of the lens unit L3b, resulting in an increase in the curvature of field when correcting image blur.

This configuration of the present invention can achieve a zoom lens capable of providing high optical performance while ensuring desired back focus.

Next, preferable conditions for the zoom lenses of the present invention will be described.

It is preferable to satisfy the following condition:

$$-2.0 < f3a/f3 < -1.0 \quad (2)$$

where f3 is the focal length of the third lens unit and f3a is the focal length of the lens unit L3a.

The conditional expression (2) is preferable to moderate positional accuracy required for the compensation lens unit while ensuring desired back focus when allotting the power of the lens unit L3a in the third lens unit. When the ratio f3a/f3 exceeds the upper limit in the conditional expression (2), it becomes difficult to ensure desired back focus, and the moving amount of the compensation lens unit increases, thus increasing changes in aberration along therewith. In contrast, the ratio falls below the lower limit in the conditional expression (2), the back focus is increased in length, which is unfavorable in downsizing. Moreover, this decreases the moving amount of the compensation lens unit, thus lowering the accuracy of eccentricity when a small photoelectric conversion element is used, or the like.

Secondly, it is preferable to satisfy the following condition:

$$25 < v3bp < 50 \quad (3)$$

where v3bp is the Abbe number of a positive lens located closest to the image among the positive lenses included in the lens unit L3b.

The conditional expression (3) is a condition on selecting a lens material for the positive lenses in the lens unit L3b and is preferable for preventing deterioration of optical performance during correction of image blur. If v3bp exceeds the upper limit in the conditional expression (3), the achromatic effect of the lens located closest to the image is increased, and the refractive power of a joint surface is decreased, so that the refractive power of the lens unit L3b is increased. Accordingly, the moving amount of the compensation lens unit is decreased, thus lowering the accuracy of eccentricity. In contrast, if v3bp falls below the lower limit, the achromatic effect of the lens located closest to the image is decreased, and the refractive power of the joint surface is increased, so that the refractive power of the lens unit L3b is decreased. Accordingly, the moving amount of the compensation lens unit is increased, thus increasing changes in aberration during correction of image blur.

For the conditional expressions (1) to (3), it is more preferable to satisfy the following numerical ranges for correcting the aberration:

$$0.40 < (R3a1 - R3a2)/(R3a1 + R3a2) < 0.80 \quad (1a)$$

$$-2.0 < f3a/f3 < -1.1 \quad (2a)$$

$$30 < v3bp < 45 \quad (3a)$$

Zoom lenses according to embodiments of the present invention will be specifically described with reference to the drawings.

FIG. 1 is a sectional view of a zoom lens according to a first embodiment of the present invention. FIGS. 2A to 2C are aberration diagrams of the zoom lens of the first embodiment, wherein FIG. 2A shows aberration at a wide-angle end, FIG. 2B shows aberration at an intermediate zooming position, and FIG. 2C shows aberration at a telescopic end.

Figure 3:
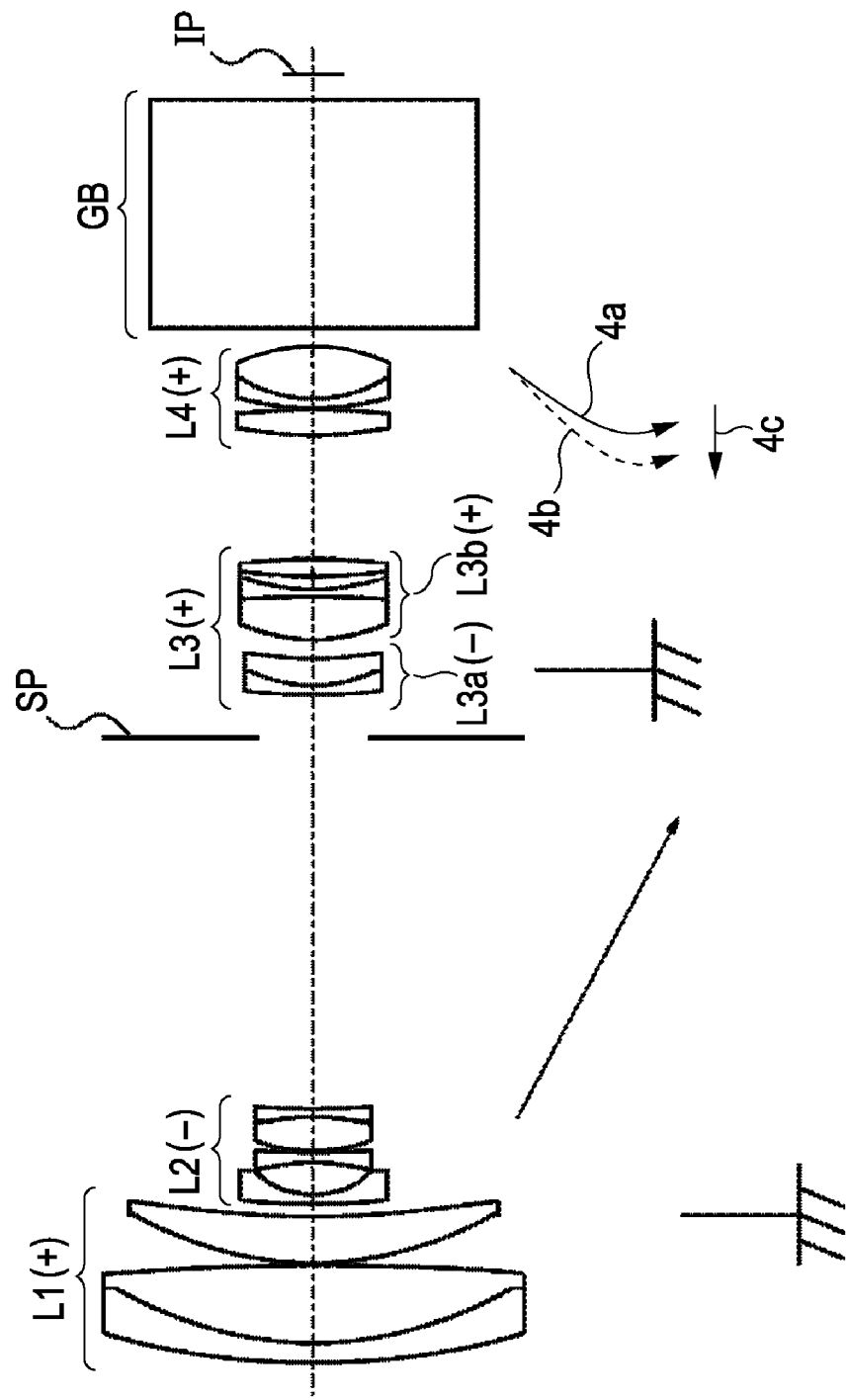
FIG. 3 is a sectional view of a zoom lens according to a second embodiment of the present invention.

FIG. 3 is a sectional view of a zoom lens according to a second embodiment of the present invention. FIGS. 4A to 4C are aberration diagrams of the zoom lens of the second embodiment, wherein FIG. 4A shows aberration at a wide-angle end, FIG. 4B shows aberration at an intermediate zooming position, and FIG. 4C shows aberration at a telephoto end.

Figure 5:
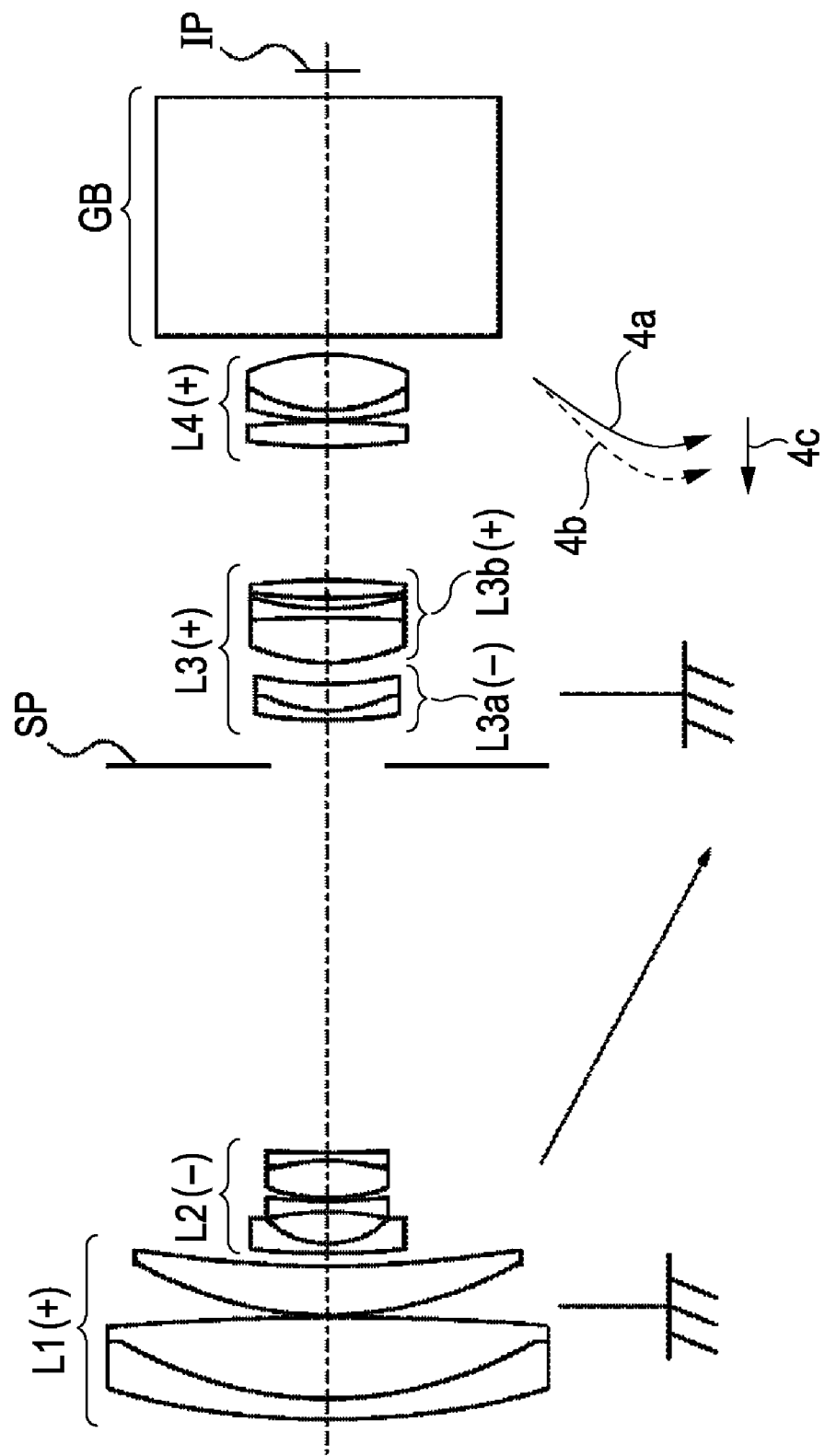
FIG. 5 is a sectional view of a zoom lens according to a third embodiment of the present invention.
Figure 6B:
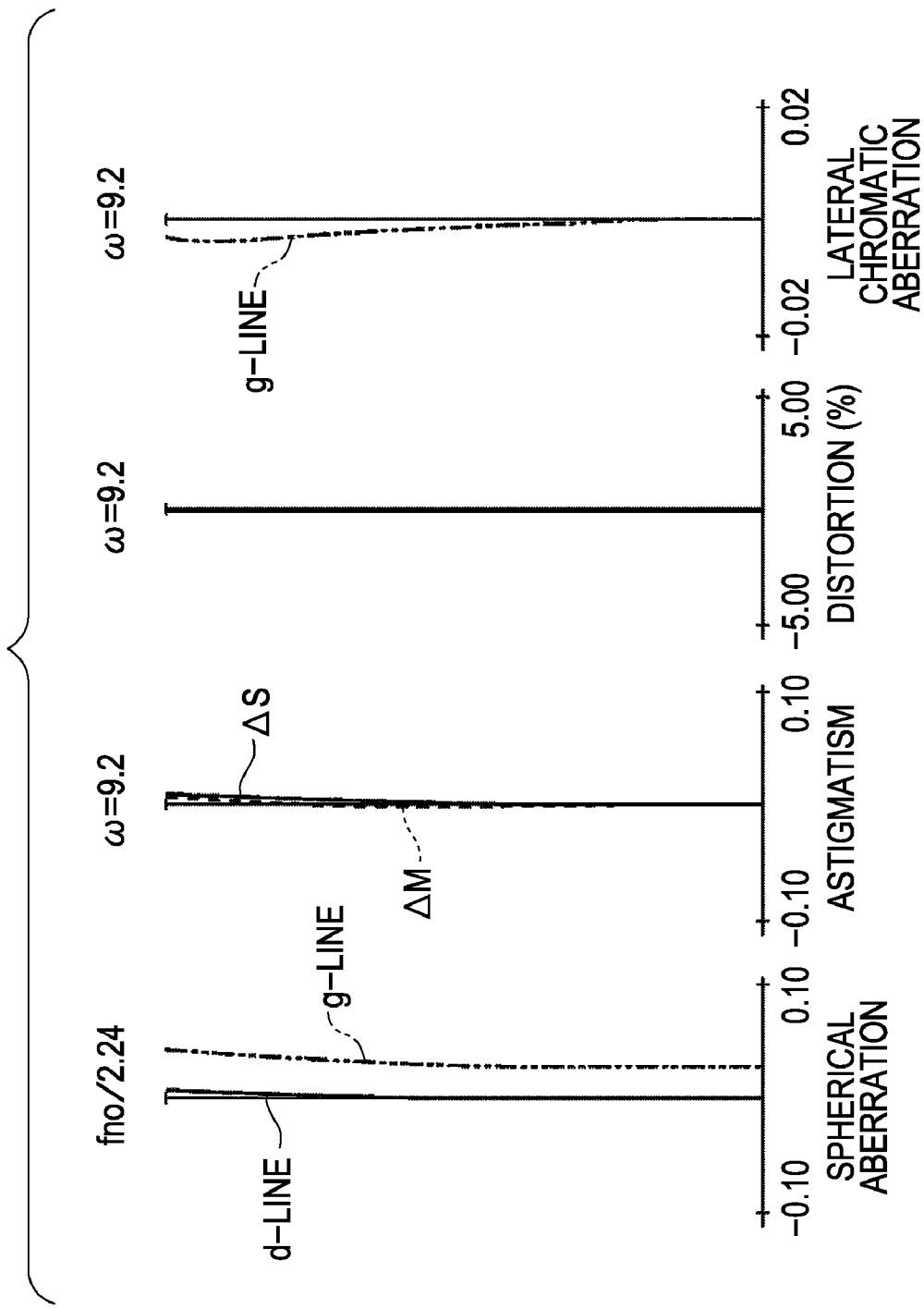

FIG. 5 is a sectional view of a zoom lens according to a third embodiment of the present invention. FIGS. 6A to 6C are aberration diagrams of the zoom lens of the third embodiment, wherein FIG. 6A shows aberration at a wide-angle end, FIG. 6B shows aberration at an intermediate zooming position, and FIG. 6C shows aberration at a telephoto end.

FIG. 7 is a sectional view of a zoom lens according to a fourth embodiment of the present invention. FIGS. 8A to 8C are aberration diagrams of the zoom lens of the fourth embodiment, wherein FIG. 8A shows aberration at a wide-angle end, FIG. 8B shows aberration at an intermediate zooming position, and FIG. 8C shows aberration at a telephoto end.

FIG. 9 is a sectional view of a zoom lens according to a fifth embodiment of the present invention. FIGS. 10A to 10C are aberration diagrams of the zoom lens of the fifth embodiment, wherein FIG. 10A shows aberration at a wide-angle end, FIG. 10B shows aberration at an intermediate zooming position, and FIG. 10C shows aberration at a telephoto end.

Figure 11:
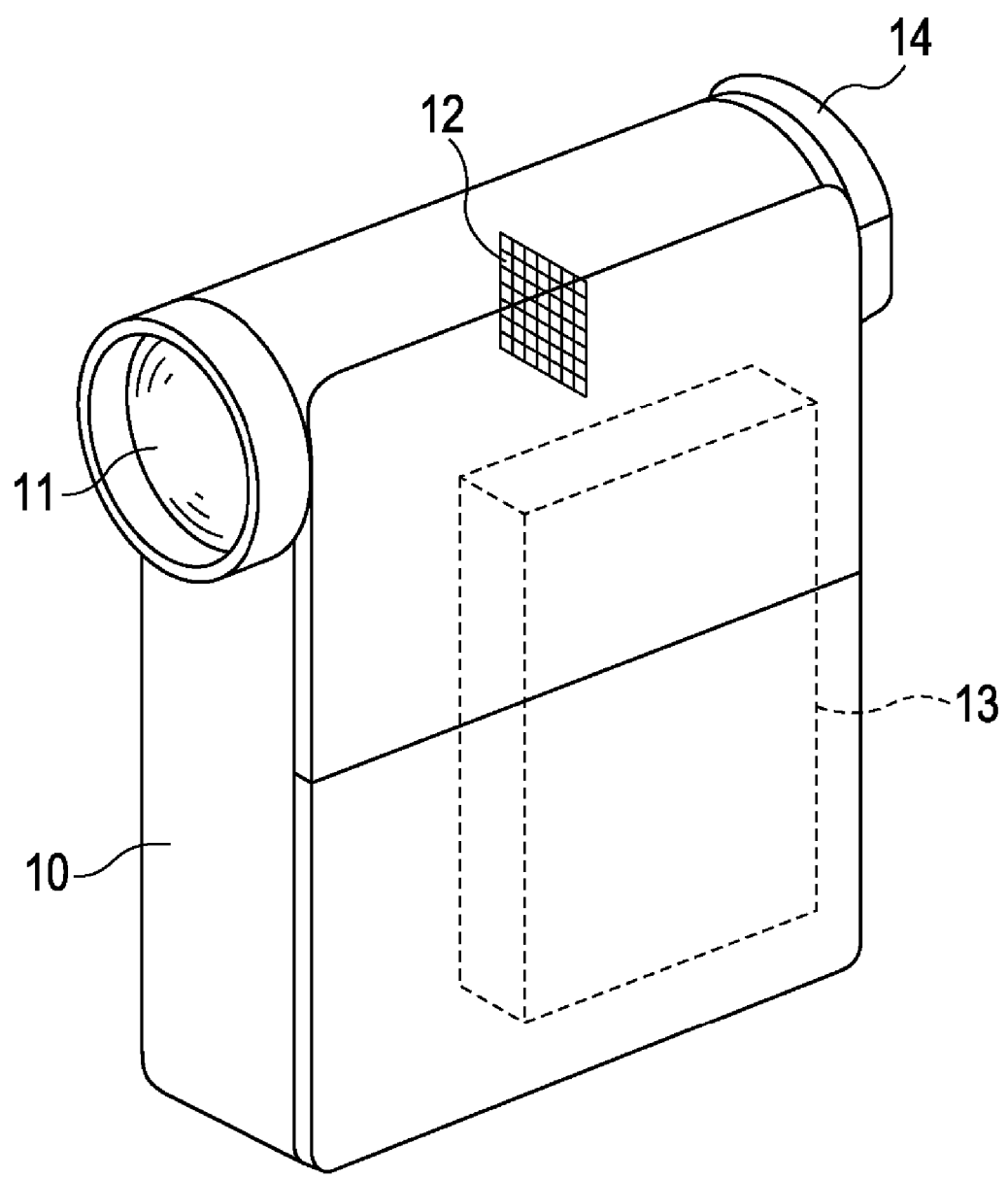
FIG. 11 is a schematic diagram of a relevant part of a video camera.

FIG. 11 is a schematic diagram of a relevant part of a video camera having a zoom lens according to an embodiment of the present invention.

In the sectional views of the lenses, reference numeral L1 denotes a first lens unit having positive refractive power, L2 denotes a second lens unit having negative refractive power, L3 denotes a third lens unit having positive refractive power, and L4 denotes a fourth lens unit having positive refractive power. The third lens unit L3 comprises a lens subunit L3a having negative refractive power and a lens subunit L3b having positive refractive power. The lens subunit L3b can be moved so as to have a component perpendicular to the optical axis. By moving the lens subunit L3b in this way, an image formed by the zoom lens can be displaced in a direction perpendicular to the optical axis, thereby correcting image blur due to hand shake.

The signs (+) and (−) in "L1 (+)" and so on in the sectional views of the lenses represent positive and negative of the refractive power of the lens units. In the sectional views of the lenses, the left indicates an object side (front, and the right indicates an image side (rear), and in order from the object side to the image side, the first lens unit L1, the second lens unit L2, the third lens unit L3, and the fourth lens unit L4 are arranged.

Reference character SP denotes an aperture stop, which is located ahead of the third lens unit L3. Reference character GB indicates a glass block intended for, for example, a color separation prism, the face plate of an image pickup element, or an optical low-pass filter, for design purpose. Reference character IP denotes an image plane. When the zoom lenses according to the embodiments of the present invention are used as a photographing optical system of video cameras and digital cameras, the image plane IP corresponds to an image pickup surface of a solid-state image pickup element (photoelectric conversion element) such as a CCD sensor or a CMOS sensor. When they are used as a photographing optical system of a silver-halide film camera, the image plane IP corresponds to a film surface.

The aberration diagrams shown in FIGS. 2A to 2C, 4A to 4C, 6A to 6C, 8A to 8C, 10A to 10C show the spherical aberration, astigmatism, distortion, and lateral chromatic aberration of the zoom lenses according to embodiments. In the diagrams showing spherical aberration, the vertical axes indicate F-number (fno), the solid lines indicate d-line, and the two-dot chain lines indicate g-line. The vertical axes in the diagrams showing astigmatism, distortion, and lateral chromatic aberration indicate a half angle of view (ω). The broken lines ΔM in the diagrams showing astigmatism indicate a meridional image plane on d-line, and solid lines ΔS indicate a sagittal image plane. Distortion is indicated by g-line with respect to d-line.

Arrows in the sectional views of the lenses indicate the loci of the movement of the individual lens unit when zooming from the wide-angle end to the telephoto end (plots of the positions of the individual lens units relative to zoom positions).

When zooming from the wide-angle end to the telephoto end, the zoom lenses of the first to fifth embodiments perform scaling by moving the second lens unit L2 toward the image and correct image plane variations due to the scaling by moving the fourth lens unit L4.

The zoom lenses adopt rear focusing system that performs focusing by moving the fourth lens unit L4 on the optical axis.

When performing focusing from an object at infinity to a nearby object at the telephoto end, the fourth lens unit L4 is moved forward as indicated by an arrow 4c shown in the sectional views of the lenses. A solid curved line 4a and a dotted line 4b related to the fourth lens unit L4 are the loci of movement for correcting image plane variations due to scaling when focusing on an object at infinity and a nearby object, respectively.

Thus, the space between the third lens unit L3 and the fourth lens unit L4 is used effectively by moving the fourth lens unit L4 in a convex locus to the object side, thereby effectively reducing the entire length of the lens.

In the zoom lenses of the first to fifth embodiments, the first lens unit L1 and the third lens unit L3 are not moved for zooming and focusing. However, the present invention may be configured to move them for the purpose of correction of aberration or the like as necessary.

Next, the configurations of the lens units of the zoom lenses of the first to fifth embodiments will be described.

The first lens unit L1 comprises a cemented lens consisting of a negative meniscus lens convex on the object side and a biconvex positive lens and a positive meniscus lens convex on the object side.

The second lens unit L2 comprises a negative meniscus lens convex on the object side, a biconcave negative lens, and a cemented lens consisting of a biconvex positive lens and a biconcave negative lens in order from the object side to the image side.

The third lens subunit L3a comprises a cemented lens consisting of a negative meniscus lens convex on the object side and a positive meniscus lens convex on the object side in order from the object side to the image side.

The third lens subunit L3b comprises a cemented lens consisting of a biconvex positive lens and a biconcave negative lens and a biconvex positive lens in order from the object side to the image side.

The fourth lens unit L4 comprises a biconvex positive lens and a cemented lens consisting of a negative meniscus lens convex on the object side and a biconvex positive lens in order from the object side to the image side.

Numerical data corresponding to the first to fifth embodiments are set out.

In the numerical data, r is the curvature radius (in mm) of each of the surfaces; d is a distance (in mm) between the adjacent surfaces; nd is the refractive index of each lens with respect to d-line; and vd is the Abbe number of each lens with respect to d-line, expressed by the following expression:

$$vd=(Nd-1)/(NF-NC)$$

where Nd: a refractive index for d-line (wavelength: 587.6 nm)

NF: a refractive index with respect to F-line (wavelength: 486.1 nm)

NC: a refractive index with respect to C-line (wavelength: 656.3 nm)

Displacement x of an aspherical surface at a height h from the optical axis in the direction of the optical axis, with respect to a surface vertex, is defined by the following expression:

$$x=(h2/R)/[1+[1-(1+K)(h/R)2]^{1/2}]+A'h3+Bh4+B'h5+Ch6+C'h7+Dh8+D'h9+Eh10+E'h11+Fh12$$

where k is a conic constant; A', B, B', C, C', D, D', E, E', F are aspherical coefficients of the individual terms; and R is a paraxial radius of curvature. "e–X" indicates "x10–X". Aspherical surfaces are marked with * on the right of surface numbers in the numerical data.

Table 1 shows the relationship between the foregoing conditional expressions and the values in the numerical data.

[First Numerical Data]
in mm surface data

| surface number | r | d | nd | vd | effective aperture |
|---|---|---|---|---|---|
| 1 | 15.091 | 0.41 | 1.84666 | 23.9 | 8.22 |
| 2 | 7.810 | 1.62 | 1.48749 | 70.2 | 7.82 |
| 3 | −65.772 | 0.05 | | | 7.69 |
| 4 | 7.269 | 0.99 | 1.77250 | 49.6 | 7.13 |
| 5 | 22.163 | (variable) | | | 6.89 |
| 6 | 10.346 | 0.19 | 1.88300 | 40.8 | 2.70 |
| 7 | 1.542 | 0.69 | | | 2.16 |
| 8 | −4.561 | 0.19 | 1.83481 | 42.7 | 2.12 |
| 9 | 13.388 | 0.06 | | | 2.13 |
| 10 | 3.568 | 0.71 | 1.84666 | 23.9 | 2.18 |
| 11 | −5.407 | 0.18 | 1.83481 | 42.7 | 2.10 |
| 12 | 21.993 | (variable) | | | 2.05 |
| 13 (aperture) | ∞ | 0.81 | | | 2.29 |
| 14 | 12.960 | 0.18 | 1.88300 | 40.8 | 2.47 |
| 15 | 3.012 | 0.55 | 1.80518 | 25.4 | 2.47 |
| 16 | 8.605 | 0.42 | | | 2.49 |

-continued

[First Numerical Data]
in mm

| | | | | | |
|---|---|---|---|---|---|
| 17* | 3.310 | 0.86 | 1.58313 | 59.4 | 2.71 |
| 18 | −16.350 | 0.18 | 1.69895 | 30.1 | 2.65 |
| 19 | 4.509 | 0.23 | | | 2.62 |
| 20 | 58.798 | 0.44 | 1.58144 | 40.8 | 2.63 |
| 21 | −6.517 | (variable) | | | 2.68 |
| 22 | 8.159 | 0.50 | 1.62299 | 58.2 | 2.87 |
| 23 | −13.459 | 0.05 | | | 2.87 |
| 24 | 5.513 | 0.21 | 1.84666 | 23.9 | 2.82 |
| 25 | 2.801 | 0.80 | 1.60311 | 60.6 | 2.71 |
| 26 | −31.644 | (variable) | | | 2.62 |
| 27 | ∞ | 4.83 | 1.58913 | 61.3 | 6.50 |
| 28 | ∞ | 0.16 | | | 6.50 |
| image plane | ∞ | | | | | aspheric surface data
$17^{th}$ surface

K = −1.15584e−001  A4 = −2.83550e−003  A6 = −3.76250e−005  A8 = −4.19613e−006 data

| zoom ratio | 15.64 | | |
|---|---|---|---|
| | wide-angle end | intermediate point | telephoto end |
| focal length | 1.00 | 5.98 | 15.64 |
| F-number | 1.85 | 2.24 | 2.88 |
| angle of view | 26.21 | 5.47 | 2.09 |
| image height | 0.49 | 0.57 | 0.57 |
| entire lens length | 25.11 | 25.11 | 25.11 |
| BF | 4.26 | 5.27 | 4.45 |
| d5 | 0.23 | 5.89 | 7.48 |
| d12 | 7.77 | 2.11 | 0.51 |
| d21 | 2.51 | 1.50 | 2.32 |
| d26 | 0.68 | 1.69 | 0.88 |
| entrance-pupil position | 4.97 | 33.40 | 70.49 |
| exit-pupil position | 23.75 | −2458.35 | 29.36 |
| front principal-point position | 6.01 | 39.37 | 94.51 |
| rear principal-point position | −0.84 | −5.82 | −15.49 | zoom lens unit data

| unit | initial surface | focal length | lens-unit length | front principal-point position | rear principal-point position |
|---|---|---|---|---|---|
| 1 | 1 | 11.12 | 3.07 | 0.90 | −1.03 |
| 2 | 6 | −1.90 | 2.04 | 0.15 | −1.29 |
| 3 | 13 | 14.30 | 3.67 | 1.84 | −1.03 |
| 4 | 22 | 4.88 | 1.56 | 0.23 | −0.75 |
| 5 | 27 | ∞ | 5.21 | 1.71 | −1.71 | single lens data

| lens | initial surface | focal length |
|---|---|---|
| 1 | 1 | −19.62 |
| 2 | 2 | 14.42 |
| 3 | 4 | 13.61 |
| 4 | 6 | −2.07 |
| 5 | 8 | −4.06 |
| 6 | 10 | 2.64 |
| 7 | 11 | −5.18 |
| 8 | 14 | −4.48 |
| 9 | 15 | 5.51 |
| 10 | 17 | 4.80 |
| 11 | 18 | −5.04 |
| 12 | 20 | 10.12 |
| 13 | 22 | 8.23 |
| 14 | 24 | −6.98 |
| 15 | 25 | 4.30 |

[Second Numerical Data]
in mm surface data

| surface number | r | d | nd | vd | effective aperture |
|---|---|---|---|---|---|
| 1 | 15.245 | 0.40 | 1.84666 | 23.9 | 8.07 |
| 2 | 7.893 | 1.61 | 1.48749 | 70.2 | 7.69 |
| 3 | −56.055 | 0.05 | | | 7.55 |
| 4 | 7.275 | 0.98 | 1.77250 | 49.6 | 7.01 |
| 5 | 21.983 | (variable) | | | 6.75 |
| 6 | 10.818 | 0.19 | 1.88300 | 40.8 | 2.67 |
| 7 | 1.522 | 0.67 | | | 2.13 |
| 8 | −4.873 | 0.19 | 1.83481 | 42.7 | 2.10 |
| 9 | 14.436 | 0.06 | | | 2.12 |
| 10 | 3.288 | 0.71 | 1.84666 | 23.9 | 2.16 |
| 11 | −6.403 | 0.18 | 1.83481 | 42.7 | 2.07 |
| 12 | 12.628 | (variable) | | | 2.01 |
| 13 (aperture) | ∞ | 0.80 | | | 2.30 |
| 14 | 11.172 | 0.18 | 1.88300 | 40.8 | 2.47 |
| 15 | 3.631 | 0.55 | 1.80518 | 25.4 | 2.47 |
| 16 | 8.249 | 0.42 | | | 2.49 |
| 17* | 3.398 | 0.85 | 1.58313 | 59.4 | 2.67 |
| 18 | −28.957 | 0.18 | 1.69895 | 30.1 | 2.62 |
| 19 | 4.620 | 0.23 | | | 2.58 |
| 20 | 294.191 | 0.43 | 1.58144 | 40.8 | 2.60 |
| 21 | −6.785 | (variable) | | | 2.65 |
| 22 | 9.135 | 0.50 | 1.62299 | 58.2 | 2.85 |
| 23 | −11.292 | 0.05 | | | 2.86 |
| 24 | 5.416 | 0.21 | 1.84666 | 23.9 | 2.81 |
| 25 | 2.877 | 0.79 | 1.60311 | 60.6 | 2.70 |
| 26 | −37.827 | (variable) | | | 2.60 |
| 27 | ∞ | 4.83 | 1.58913 | 61.3 | 6.44 |
| 28 | ∞ | 0.15 | | | 6.44 |
| image plane | ∞ | | | | | aspheric surface data
17$^{th}$ surface

K = −2.07326e−001  A4 = −2.84727e−003  A6 = 8.29045e−005  A8 = −2.10372e−005 data

| | zoom ratio | 15.67 | |
|---|---|---|---|
| | wide-angle end | intermediate point | telephoto end |
| focal length | 1.00 | 5.99 | 15.67 |
| F-number | 1.85 | 2.24 | 2.88 |
| angle of view | 25.99 | 5.40 | 2.07 |
| image height | 0.49 | 0.57 | 0.57 |
| entire lens length | 24.93 | 24.93 | 24.93 |
| BF | 4.21 | 5.25 | 4.42 |
| d5 | 0.23 | 5.83 | 7.41 |
| d12 | 7.73 | 2.13 | 0.55 |
| d21 | 2.53 | 1.49 | 2.31 |
| d26 | 0.67 | 1.71 | 0.88 |
| entrance-pupil position | 4.93 | 33.12 | 69.89 |
| exit-pupil position | 23.03 | −704.92 | 29.04 |
| front principal-point position | 5.98 | 39.06 | 94.07 |
| rear principal-point position | −0.85 | −5.84 | −15.52 | zoom lens unit data

| unit | initial surface | focal length | lens-unit length | front principal-point position | rear principal-point position |
|---|---|---|---|---|---|
| 1 | 1 | 11.02 | 3.04 | 0.90 | −1.02 |
| 2 | 6 | −1.87 | 2.01 | 0.16 | −1.23 |
| 3 | 13 | 13.97 | 3.64 | 1.58 | −1.26 |
| 4 | 22 | 4.81 | 1.54 | 0.23 | −0.74 |
| 5 | 27 | ∞ | 5.15 | 1.69 | −1.69 | single lens data

| lens | initial surface | focal length |
|---|---|---|
| 1 | 1 | −19.83 |
| 2 | 2 | 14.31 |

-continued

[Second Numerical Data]
in mm

| | | |
|---|---|---|
| 3 | 4 | 13.68 |
| 4 | 6 | −2.03 |
| 5 | 8 | −4.34 |
| 6 | 10 | 2.65 |
| 7 | 11 | −5.07 |
| 8 | 14 | −6.16 |
| 9 | 15 | 7.65 |
| 10 | 17 | 5.27 |
| 11 | 18 | −5.69 |
| 12 | 20 | 11.41 |
| 13 | 22 | 8.18 |
| 14 | 24 | −7.53 |
| 15 | 25 | 4.47 |

[Third Numerical Data]
in mm surface data

| surface number | r | d | nd | vd | effective aperture |
|---|---|---|---|---|---|
| 1 | 15.398 | 0.40 | 1.84666 | 23.9 | 7.43 |
| 2 | 7.866 | 1.61 | 1.48749 | 70.2 | 7.16 |
| 3 | −53.670 | 0.05 | | | 7.04 |
| 4 | 7.234 | 0.98 | 1.77250 | 49.6 | 6.83 |
| 5 | 22.003 | (variable) | | | 6.62 |
| 6 | 11.939 | 0.19 | 1.88300 | 40.8 | 2.65 |
| 7 | 1.538 | 0.66 | | | 2.13 |
| 8 | −5.192 | 0.19 | 1.83481 | 42.7 | 2.09 |
| 9 | 9.312 | 0.06 | | | 2.11 |
| 10 | 3.318 | 0.71 | 1.84666 | 23.9 | 2.16 |
| 11 | −6.181 | 0.18 | 1.83481 | 42.7 | 2.08 |
| 12 | 20.907 | (variable) | | | 2.03 |
| 13 (aperture) | ∞ | 0.80 | | | 2.28 |
| 14 | 7.320 | 0.18 | 1.88300 | 40.8 | 2.47 |
| 15 | 3.062 | 0.55 | 1.80518 | 25.4 | 2.45 |
| 16 | 5.814 | 0.42 | | | 2.44 |
| 17* | 3.345 | 0.85 | 1.58313 | 59.4 | 2.61 |
| 18 | −24.985 | 0.18 | 1.69895 | 30.1 | 2.56 |
| 19 | 4.659 | 0.23 | | | 2.53 |
| 20 | 346.791 | 0.43 | 1.60342 | 38.0 | 2.54 |
| 21 | −7.662 | (variable) | | | 2.59 |
| 22 | 9.430 | 0.50 | 1.62299 | 58.2 | 2.86 |
| 23 | −11.971 | 0.05 | | | 2.87 |
| 24 | 5.088 | 0.21 | 1.84666 | 23.9 | 2.83 |
| 25 | 2.727 | 0.79 | 1.60311 | 60.6 | 2.72 |
| 26 | −25.375 | (variable) | | | 2.64 |
| 27 | ∞ | 4.83 | 1.58913 | 61.3 | 6.44 |
| 28 | ∞ | 0.15 | | | 6.44 |
| image plane | ∞ | | | | | aspheric surface data
17th surface

K = −1.45903e−001  A4 = −2.74549e−003  A6 = 8.17877e−005  A8 = −3.71173e−005 data

| zoom ratio | | 15.69 | |
|---|---|---|---|
| | wide-angle end | intermediate point | telephoto end |
| focal length | 1.00 | 5.99 | 15.69 |
| F-number | 1.85 | 2.24 | 2.88 |
| angle of view | 25.99 | 5.40 | 2.07 |
| image height | 0.49 | 0.57 | 0.57 |
| entire lens length | 24.88 | 24.88 | 24.88 |
| BF | 4.21 | 5.21 | 4.34 |
| d5 | 0.23 | 5.83 | 7.41 |
| d12 | 7.74 | 2.14 | 0.56 |
| d21 | 2.49 | 1.49 | 2.36 |
| d26 | 0.67 | 1.67 | 0.80 |

-continued

[Third Numerical Data]
in mm

| | | | |
|---|---|---|---|
| entrance-pupil position | 4.91 | 33.13 | 70.42 |
| exit-pupil position | 20.53 | 431.82 | 23.20 |
| front principal-point position | 5.96 | 39.20 | 96.79 |
| rear principal-point position | −0.85 | −5.84 | −15.53 | zoom lens unit data

| unit | initial surface | focal length | lens-unit length | front principal-point position | rear principal-point position |
|---|---|---|---|---|---|
| 1 | 1 | 10.97 | 3.04 | 0.91 | −1.01 |
| 2 | 6 | −1.90 | 1.99 | 0.13 | −1.27 |
| 3 | 13 | 15.00 | 3.64 | 1.23 | −1.61 |
| 4 | 22 | 4.65 | 1.54 | 0.26 | −0.71 |
| 5 | 27 | ∞ | 5.15 | 1.69 | −1.69 | single lens data

| lens | initial surface | focal length |
|---|---|---|
| 1 | 1 | −19.47 |
| 2 | 2 | 14.19 |
| 3 | 4 | 13.56 |
| 4 | 6 | −2.02 |
| 5 | 8 | −3.97 |
| 6 | 10 | 2.64 |
| 7 | 11 | −5.70 |
| 8 | 14 | −6.08 |
| 9 | 15 | 7.38 |
| 10 | 17 | 5.12 |
| 11 | 18 | −5.60 |
| 12 | 20 | 12.43 |
| 13 | 22 | 8.54 |
| 14 | 24 | −7.23 |
| 15 | 25 | 4.13 |

[Fourth Numerical Data]
in mm surface data

| surface number | r | d | nd | vd | effective aperture |
|---|---|---|---|---|---|
| 1 | 16.167 | 0.41 | 1.84666 | 23.9 | 7.59 |
| 2 | 8.053 | 1.62 | 1.48749 | 70.2 | 7.31 |
| 3 | −44.568 | 0.05 | | | 7.21 |
| 4 | 7.206 | 0.99 | 1.77250 | 49.6 | 6.87 |
| 5 | 20.887 | (variable) | | | 6.65 |
| 6 | 11.583 | 0.19 | 1.88300 | 40.8 | 2.72 |
| 7 | 1.549 | 0.66 | | | 2.18 |
| 8 | −5.419 | 0.19 | 1.83481 | 42.7 | 2.15 |
| 9 | 9.338 | 0.06 | | | 2.16 |
| 10 | 3.313 | 0.71 | 1.84666 | 23.9 | 2.21 |
| 11 | −5.819 | 0.18 | 1.83481 | 42.7 | 2.13 |
| 12 | 18.719 | (variable) | | | 2.08 |
| 13 (aperture) | ∞ | 0.81 | | | 2.26 |
| 14 | 24.209 | 0.18 | 1.88300 | 40.8 | 2.43 |
| 15 | 2.891 | 0.55 | 1.80518 | 25.4 | 2.45 |
| 16 | 11.325 | 0.42 | | | 2.48 |
| 17* | 3.155 | 0.86 | 1.58313 | 59.4 | 2.72 |
| 18 | −10.683 | 0.18 | 1.69895 | 30.1 | 2.68 |
| 19 | 4.306 | 0.24 | | | 2.64 |
| 20 | 76.778 | 0.44 | 1.60342 | 38.0 | 2.65 |
| 21 | −5.964 | (variable) | | | 2.71 |
| 22 | 7.512 | 0.50 | 1.62299 | 58.2 | 2.88 |
| 23 | −14.104 | 0.05 | | | 2.87 |
| 24 | 5.611 | 0.21 | 1.84666 | 23.9 | 2.82 |
| 25 | 2.778 | 0.80 | 1.60311 | 60.6 | 2.70 |
| 26 | −38.785 | (variable) | | | 2.61 |
| 27 | ∞ | 4.83 | 1.58913 | 61.3 | 6.50 |
| 28 | ∞ | 0.16 | | | 6.50 |

-continued

[Fourth Numerical Data]
in mm

| image plane | ∞ |
|---|---| aspheric surface data
17$^{th}$ surface

K = −1.89482e−001   A4 = −2.86649e−003   A6 = −6.78768e−005   A8 = 1.11313e−005 data

| zoom ratio | | 15.64 | |
|---|---|---|---|
| | wide-angle end | intermediate point | telephoto end |
| focal length | 1.00 | 5.96 | 15.64 |
| F-number | 1.85 | 2.24 | 2.88 |
| angle of view | 26.21 | 5.48 | 2.09 |
| image height | 0.49 | 0.57 | 0.57 |
| entire lens length | 25.03 | 25.03 | 25.03 |
| BF | 4.26 | 5.21 | 4.35 |
| d5 | 0.23 | 5.88 | 7.48 |
| d12 | 7.77 | 2.11 | 0.52 |
| d21 | 2.45 | 1.50 | 2.36 |
| d26 | 0.69 | 1.63 | 0.78 |
| entrance-pupil position | 4.96 | 33.34 | 70.21 |
| exit-pupil position | 25.00 | 993.66 | 27.51 |
| front principal-point position | 6.00 | 39.33 | 94.80 |
| rear principal-point position | −0.84 | −5.80 | −15.48 | zoom lens unit data

| unit | initial surface | focal length | lens-unit length | front principal-point position | rear principal-point position |
|---|---|---|---|---|---|
| 1 | 1 | 11.08 | 3.07 | 0.92 | −1.01 |
| 2 | 6 | −1.93 | 2.01 | 0.14 | −1.27 |
| 3 | 13 | 14.53 | 3.69 | 2.18 | −0.67 |
| 4 | 22 | 4.93 | 1.56 | 0.21 | −0.77 |
| 5 | 27 | ∞ | 5.21 | 1.71 | −1.71 | single lens data

| lens | initial surface | focal length |
|---|---|---|
| 1 | 1 | −19.40 |
| 2 | 2 | 14.13 |
| 3 | 4 | 13.81 |
| 4 | 6 | −2.04 |
| 5 | 8 | −4.08 |
| 6 | 10 | 2.59 |
| 7 | 11 | −5.30 |
| 8 | 14 | −3.73 |
| 9 | 15 | 4.69 |
| 10 | 17 | 4.28 |
| 11 | 18 | −4.37 |
| 12 | 20 | 9.19 |
| 13 | 22 | 7.94 |
| 14 | 24 | −6.73 |
| 15 | 25 | 4.33 |

[Fifth Numerical Data]
in mm surface data

| surface number | r | d | nd | vd | effective aperture |
|---|---|---|---|---|---|
| 1 | 15.022 | 0.40 | 1.84666 | 23.9 | 7.42 |
| 2 | 7.709 | 1.61 | 1.48749 | 70.2 | 7.14 |
| 3 | −63.120 | 0.05 | | | 7.03 |
| 4 | 7.217 | 0.98 | 1.77250 | 49.6 | 6.81 |
| 5 | 22.446 | (variable) | | | 6.60 |
| 6 | 11.050 | 0.19 | 1.88300 | 40.8 | 2.67 |

-continued

[Fifth Numerical Data]
in mm

| | | | | | |
|---|---|---|---|---|---|
| 7 | 1.523 | 0.66 | | | 2.13 |
| 8 | −5.364 | 0.19 | 1.83481 | 42.7 | 2.10 |
| 9 | 8.689 | 0.06 | | | 2.11 |
| 10 | 3.264 | 0.71 | 1.84666 | 23.9 | 2.16 |
| 11 | −6.203 | 0.18 | 1.83481 | 42.7 | 2.09 |
| 12 | 20.291 | (variable) | | | 2.04 |
| 13 (aperture) | ∞ | 0.80 | | | 2.26 |
| 14 | 11.754 | 0.18 | 1.88300 | 40.8 | 2.44 |
| 15 | 2.821 | 0.55 | 1.80518 | 25.4 | 2.44 |
| 16 | 8.273 | 0.42 | | | 2.46 |
| 17* | 3.178 | 0.85 | 1.58313 | 59.4 | 2.67 |
| 18 | −7.980 | 0.18 | 1.69895 | 30.1 | 2.61 |
| 19 | 4.165 | 0.23 | | | 2.57 |
| 20 | 42.216 | 0.43 | 1.68893 | 31.1 | 2.59 |
| 21 | −7.663 | (variable) | | | 2.64 |
| 22 | 7.493 | 0.50 | 1.62299 | 58.2 | 2.87 |
| 23 | −13.473 | 0.05 | | | 2.87 |
| 24 | 5.355 | 0.21 | 1.84666 | 23.9 | 2.82 |
| 25 | 2.682 | 0.79 | 1.60311 | 60.6 | 2.69 |
| 26 | −36.541 | (variable) | | | 2.61 |
| 27 | ∞ | 4.83 | 1.58913 | 61.3 | 6.44 |
| 28 | ∞ | 0.15 | | | 6.44 |
| image plane | ∞ | | | | | aspheric surface data
$17^{th}$ surface

K = −1.12900e−001  A4 = −2.37610e−003  A6 = −6.79198e−005  A8 = 1.68014e−006 data

| | zoom ratio | 15.69 | |
|---|---|---|---|
| | wide-angle end | intermediate point | telephoto end |
| focal length | 1.00 | 6.00 | 15.69 |
| F-number | 1.85 | 2.24 | 2.88 |
| angle of view | 25.99 | 5.39 | 2.07 |
| image height | 0.49 | 0.57 | 0.57 |
| entire lens length | 24.82 | 24.82 | 24.82 |
| BF | 4.21 | 5.19 | 4.31 |
| d5 | 0.23 | 5.83 | 7.41 |
| d12 | 7.70 | 2.10 | 0.52 |
| d21 | 2.46 | 1.48 | 2.36 |
| d26 | 0.67 | 1.65 | 0.77 |
| entrance-pupil position | 4.92 | 33.14 | 70.09 |
| exit-pupil position | 23.51 | −1777.09 | 26.05 |
| front principal-point position | 5.97 | 39.12 | 95.28 |
| rear principal-point position | −0.85 | −5.85 | −15.53 | zoom lens unit data

| unit | initial surface | focal length | lens-unit length | front principal-point position | rear principal-point position |
|---|---|---|---|---|---|
| 1 | 1 | 10.98 | 3.04 | 0.90 | −1.01 |
| 2 | 6 | −1.91 | 2.00 | 0.13 | −1.27 |
| 3 | 13 | 14.88 | 3.65 | 1.70 | −1.13 |
| 5 | 22 | 4.76 | 1.54 | 0.21 | −0.76 |
| 6 | 27 | ∞ | 5.16 | 1.69 | −1.69 | single lens data

| lens | initial surface | focal length |
|---|---|---|
| 1 | 1 | −19.19 |
| 2 | 2 | 14.20 |
| 3 | 4 | 13.39 |
| 4 | 6 | −2.02 |
| 5 | 8 | −3.95 |
| 6 | 10 | 2.62 |
| 7 | 11 | −5.67 |
| 8 | 14 | −4.24 |
| 9 | 15 | 5.09 |
| 10 | 17 | 4.01 |
| 11 | 18 | −3.89 |
| 12 | 20 | 9.45 |

-continued

[Fifth Numerical Data]
in mm

| 13 | 22 | 7.80 |
|----|----|------|
| 14 | 24 | −6.58 |
| 15 | 25 | 4.17 |

TABLE 1

|     | Numerical Data 1 | Numerical Data 2 | Numerical Data 3 | Numerical Data 4 | Numerical Data 5 |
|-----|------|------|------|------|------|
| (1) | 0.62 | 0.51 | 0.41 | 0.79 | 0.61 |
| (2) | −1.42 | −1.91 | −1.78 | −1.13 | −1.41 |
| (3) | 40.8 | 40.8 | 38.0 | 38.0 | 31.1 |

An image capturing apparatus (video camera) according to an embodiment of the present invention which uses the zoom lens having one of Numerical Data 1 to 5 as a photographing optical system will be described with reference to FIG. 11.

Referring to FIG. 11, reference numeral 10 denotes an image capturing apparatus main body; 11 denotes a photographing optical system constituted by the zoom lens with one of Numerical Data 1 to 5; 12 denotes an image pickup element, such as a CCD, that receives an object image formed by the photographing optical system 11; 13 denotes a memory in which an object image received by the image pickup element is recorded; and 14 denotes a finder for observing an object image. Examples of the finder 14 include an optical finder and finders of the type that observe an object image displayed on a display device such as a liquid-crystal panel.

By applying the zoom lens with one of Numerical Data 1 to 5 to an image capturing apparatus such as a video camera, a compact image capturing apparatus having high optical performance can be achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-159666 filed on Jun. 18, 2008 and No. 2009-013317 filed on Jan. 23, 2009, which are hereby incorporated by reference herein in their entirety.

What is claimed is:

1. A zoom lens comprising, in order from an object side to an image side thereof, a first lens unit having positive refractive power, a second lens unit having negative refractive power, a third lens unit having positive refractive power, and a fourth lens unit having positive refractive power, wherein the distance between the adjacent lens units changes when zooming, wherein:

the third lens unit includes, in order from the object side to the image side, a first lens subunit having negative refractive power and a second lens subunit having positive refractive power, wherein the zoom lens is configured to displace an image formed by the zoom lens in a direction perpendicular to its optical axis by moving the second lens subunit so as to have a component perpendicular to the optical axis and the following conditions are satisfied:

$$0.40 < (R3a1 - R3a2)/(R3a1 + R3a2) < 0.85$$

$$2.0 < f3a/f3 < -1.0$$

where $R3a1$ is a curvature radius of a surface, closest to the object, of the first lens subunit, $R3a2$ is a curvature radius of a surface, second closest to the object, of the first lens subunit, $f3$ is a focal length of the third lens unit, and $f3a$ is a focal length of the first lens subunit.

2. The zoom lens according to claim 1, wherein the second lens subunit includes a plurality of positive lenses, and wherein the following condition is satisfied:

$$25 < v3bp < 50$$

where $v3\,bp$ is an Abbe number of a positive lens, located closest to the image, of the positive lenses included in the second lens subunit.

3. A camera comprising the zoom lens according to claim 1 and a photoelectric conversion element that receives an image formed by the zoom lens.

* * * * *